United States Patent
Akiyama

(10) Patent No.: US 12,549,362 B2
(45) Date of Patent: *Feb. 10, 2026

(54) ENCRYPTION DEVICE, DECRYPTION DEVICE, KEY GENERATION DEVICE, ENCRYPTION METHOD, DECRYPTION METHOD, KEY GENERATION METHOD, COMPUTER PROGRAM PRODUCT FOR ENCRYPTION, COMPUTER PROGRAM PRODUCT FOR DECRYPTION, AND COMPUTER PROGRAM PRODUCT FOR KEY GENERATION

(71) Applicant: KABUSHIKI KAISHA TOSHIBA, Tokyo (JP)

(72) Inventor: Koichiro Akiyama, Setagaya Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 157 days.

This patent is subject to a terminal disclaimer.

(21) Appl. No.: 18/458,570

(22) Filed: Aug. 30, 2023

(65) Prior Publication Data
US 2024/0205006 A1    Jun. 20, 2024

(30) Foreign Application Priority Data
Dec. 6, 2022 (JP) .............................. JP2022-195181

(51) Int. Cl.
*H04L 9/30* (2006.01)
*H04L 9/06* (2006.01)

(52) U.S. Cl.
CPC .............. *H04L 9/3026* (2013.01); *H04L 9/06* (2013.01)

(58) Field of Classification Search
CPC ......... H04L 9/3026; H04L 9/06; H04L 9/008; H04L 9/3093
See application file for complete search history.

(56) References Cited

U.S. PATENT DOCUMENTS 5,740,250 A    4/1998  Moh
6,959,085 B1   10/2005 Hoffstein et al.
(Continued)

FOREIGN PATENT DOCUMENTS

JP    2010-204466 A    9/2010
JP    2021-124679 A    8/2021
(Continued)

OTHER PUBLICATIONS

M. Mosca, "Cybersecurity in an era with quantum computers: will we be ready?".
(Continued)

*Primary Examiner* — Lynn D Feild
*Assistant Examiner* — Abdullah Almamun
(74) *Attorney, Agent, or Firm* — Finnegan, Henderson, Farabow, Garrett & Dunner, LLP

(57) ABSTRACT

According to one embodiment, an encryption device includes a memory and one or more processors. The one or more processors are configured to: acquire, as a public key, an n-variable symmetric indeterminate equation having an element not more than a constant degree of $F_p[t]$ and being symmetric for at least two variables; embed the plaintext into coefficients of an n-variable plaintext polynomial having an element not more than a constant degree of $F_p[t]$; randomly generate an n-variable polynomial having an element not more than a constant degree of $F_p[t]$, randomly generate an n-variable symmetric polynomial having an element not more than a constant degree of $F_p[t]$ and being symmetric for at least two variables, and randomly generate (Continued)

a noise polynomial having an element not more than a constant degree of $F_p[t]$; and generate a ciphertext from the three polynomials and the equation for the n-variable plaintext polynomial.

6 Claims, 11 Drawing Sheets

(56) References Cited

U.S. PATENT DOCUMENTS

| | | | |
|---|---|---|---|
| 7,773,747 B2 | 8/2010 | Akiyama et al. | |
| 7,787,623 B2* | 8/2010 | Akiyama | H04L 9/3026 380/46 |
| 8,356,183 B2* | 1/2013 | Takahashi | H04L 63/0861 713/186 |
| 8,522,033 B2* | 8/2013 | Sakumoto | H04L 9/3221 713/176 |
| 8,532,289 B2* | 9/2013 | Gentry | H04L 9/0816 380/278 |
| 11,288,985 B2* | 3/2022 | Akiyama | H04L 9/0825 |
| 12,034,850 B2* | 7/2024 | Akiyama | H04L 9/0825 |
| 2002/0001383 A1* | 1/2002 | Kasahara | H04L 9/3093 380/30 |
| 2004/0151307 A1 | 8/2004 | Wang et al. | |
| 2006/0251247 A1 | 11/2006 | Akiyama et al. | |
| 2007/0061572 A1* | 3/2007 | Imai | H04L 9/3026 713/169 |
| 2007/0110232 A1* | 5/2007 | Akiyama | H04L 9/3026 380/268 |
| 2008/0019511 A1* | 1/2008 | Akiyama | G06F 7/724 708/491 |
| 2009/0185680 A1* | 7/2009 | Akiyama | H04L 9/3093 380/30 |
| 2010/0054480 A1* | 3/2010 | Schneider | H04L 9/085 380/283 |
| 2010/0226496 A1* | 9/2010 | Akiyama | H04L 9/3093 380/28 |
| 2010/0329447 A1* | 12/2010 | Akiyama | H04L 9/3026 380/28 |
| 2012/0039473 A1* | 2/2012 | Gentry | H04L 9/3026 380/277 |
| 2013/0089201 A1* | 4/2013 | Sakumoto | H04L 9/3271 380/44 |
| 2013/0177151 A1 | 7/2013 | Sella et al. | |
| 2015/0033025 A1* | 1/2015 | Hoffstein | H04L 9/3026 713/176 |
| 2015/0172258 A1* | 6/2015 | Komano | H04L 9/008 380/259 |
| 2016/0119120 A1* | 4/2016 | Wang | H04L 9/0618 380/30 |
| 2018/0034630 A1* | 2/2018 | Rietman | H04L 9/0869 |
| 2019/0312728 A1* | 10/2019 | Poeppelmann | H04L 9/0662 |
| 2021/0248928 A1 | 8/2021 | Akiyama | |
| 2022/0150064 A1 | 5/2022 | Akiyama | |
| 2024/0195607 A1* | 6/2024 | Akiyama | H04L 9/3026 |
| 2024/0205006 A1 | 6/2024 | Akiyama | |
| 2024/0214201 A1* | 6/2024 | Hoshizuki | H04L 9/3093 |

FOREIGN PATENT DOCUMENTS

| | | |
|---|---|---|
| JP | 2022-077754 A | 5/2022 |
| JP | 2024-81510 A | 6/2024 |

OTHER PUBLICATIONS

J.von zur Gathen et al, "Approximate polynomial gcd: Small degree and small height perturbations," J. of Symbolic Computations, vol. 45, pp. 879-886, DOI: 10.1016/j.jsc.2010.04.001 (2010).

Yuichi Komano et al., "Algebraic Surface Cryptosystems using Polynomial Approximate GCD," IEICE Technical Report ISEC2016-35, ITE2016-29, ICSS2016-35, EMM2016-43(Jul. 2016), pp. 217-222, and translation, 12 pages (2016).

Craig Gentry, "Fully Homomorphic Encryption Using Ideal Lattices," ACM, pp. 169-178 (2009).

Abdelrahaman Aly et al., "Design of Symmetric-Key Primitives for Advances Cryptographic Protocols," 2020, IACR, vol. 2020, No. 3, pp. 1-45 (2020).

Tsuyoshi Takagi et al., "The Multi-variable Modular Polynomial and Its Applications to Cryptography," ISAAC, pp. 386-396 (1996).

Zhicheng Gao et al., "Degree Distribution of the Greatest Common Divisor of Polynomials over $F_q$," Random Structures and Algorithms, vol. 29, No. 1, pp. 26-37, DOI: 10.1002/rsa20093 (2006).

USPTO, Notice of Allowance in U.S. Appl. No. 17/459,320 (May 2, 2024).

USPTO, Final Office Action in U.S. Appl. No. 17/459,320 (Sep. 29, 2023).

USPTO, Non-Final Office Action in U.S. Appl. No. 17/459,320 (Mar. 17, 2023).

USPTO, Notice of Allowance in U.S. Appl. No. 17/004,211 (Dec. 24, 2021).

Japan Patent Office, Office Action in JP App. No. 2022-195181, (Aug. 5, 2025).

Yuto Mashima et al., "C language implementation of an indeterminate equation encryption scheme based on the approximate ideal GCD problem and fast implementation using Karatsuba method," Information Processing Society of Japan, Computer Security Symposium 2022, pp. 698-705 (2022).

USPTO, Non-Final Office Action in U.S. Appl. No. 18/459,261 (Aug. 6, 2025).

* cited by examiner

Algorithm 1 APPROXIMATE GCD ALGORITHM

Require: $f_1(t), f_2(t), \deg s(t)$  $(f_1(t) = s(t)e_1(t) + a_1(t),\ f_2(t) = s(t)e_2(t) + a_2(t))$
Ensure: $s(t)e'(t)(e'(t) = GCD(e_1(t), e_2(t)))$ for $D = \deg s(t)$ to $\deg s(t) + n$ do
    $r_1 := f_1(t);\ r_2 := f_2(t);\ s_1 := 1;\ s_2 := 0;$
    $t_1 := 0;\ t_2 := 1;$
    while $r_2 \neq 0$ do
      $q = r_1/r_2;\ dmy := r_1 - q \cdot r_2;\ r_1 := r_2;\ r_2 := dmy$
      $dmy := s_1 - q \cdot s_2;\ s_1 := s_2;\ s_2 := dmy$
      $dmy := t_1 - q \cdot t_2;\ t_1 := t_2;\ t_2 := dmy$
      if $(\deg f_1(t) - \deg t_2 = D) \wedge (\deg f_2(t) - \deg s_2 = D)$ then
        break
      end if
    end while
    if $(s_2 = 0) \vee (t_2 = 0)$ then
      continue
    end if
  end for
  if $(s_2 = 0) \vee (t_2 = 0)$ then
    return error
  else
    $s(t)e'(t) := f_1(t)/t_2$
    $a_1(t) := f_1(t) \bmod s(t)e'(t);\ a_2(t) := f_2(t) \bmod s(t)e'(t)$
    return $s(t)e'(t), a_1(t), a_2(t)$
  end if

Algorithm 2 IDEA DECOMPOSITION ALGORITHM

---
Require: $f, X$ such that $f = \prod_{\ell=1}^{n} h_\ell + Xr$
Ensure: $h_\ell$ $(1 \leq \ell \leq n)$
  $\ell = 1$
  FACTORIZE $Res_x(f,X)$ TO OBTAIN FACTOR $Res_x(h_k,X)$ $(k=1, \cdots, n)$.
  FACTORIZE $Res_y(f,X)$ TO OBTAIN FACTOR $Res_y(h_v,X)$ $(v=1, \cdots, n)$.
  for $\kappa = 1$ to $n$ do
    for $\nu = 1$ to $n$ do
      CALCULATE GROEBNER BASIS $G=\{g_1, \cdots, g_s\}$ OF IDEAL $J=(X, Res_x(h_k,X), Res_y(h_v,X))$
      CALCULATE $NF_G(f)$ ASSUMING $h = \sum_{(i,j,k) \in \Delta_h} \mu_{ijk} x^i y^j t^k$
      ESTABLISH SIMULTANEOUS EQUATIONS BY COMPARING COEFFICIENTS OF $x^i y^j t^k$ FROM $NF_G(f)=0$
      SOLVE SIMULTANEOUS EQUATIONS TO DETERMINE COEFFICIENT $\mu_{ijk}$ AND DERIVE FACTOR $h$
      if $(h \neq 0)$ then
        $h_\ell := h; \ell := \ell + 1$
      end if
    end for
  end for
  return $h_\ell$ $(1 \leq \ell \leq n)$
---

ENCRYPTION DEVICE, DECRYPTION DEVICE, KEY GENERATION DEVICE, ENCRYPTION METHOD, DECRYPTION METHOD, KEY GENERATION METHOD, COMPUTER PROGRAM PRODUCT FOR ENCRYPTION, COMPUTER PROGRAM PRODUCT FOR DECRYPTION, AND COMPUTER PROGRAM PRODUCT FOR KEY GENERATION

CROSS-REFERENCE TO RELATED APPLICATIONS

This application is based upon and claims the benefit of priority from Japanese Patent Application No. 2022-195181, filed on Dec. 6, 2022; the entire contents of which are incorporated herein by reference.

FIELD

Embodiments described herein relate generally to an encryption device, a decryption device, a key generation device, an encryption method, a decryption method, a key generation method, a computer program product for encryption, a computer program product for decryption, and a computer program product for key generation.

BACKGROUND

Cryptography is a technique widely used as means for protecting the confidentiality and authenticity of information in a networked society in which people communicate with a large amount of information such as e-mails exchanged over a network. On the other hand, even RSA cryptography and elliptic curve cryptography that are currently widely used are exposed to a risk of being decrypted when a quantum computer appears.

A problem to be solved by the present disclosure is to provide an encryption device, a decryption device, a key generation device, an encryption method, a decryption method, a key generation method, a computer program product for encryption, a computer program product for decryption, and a computer program product for key generation, which can ensure security even when a quantum computer appears and can further shorten a ciphertext length.

BRIEF DESCRIPTION OF THE DRAWINGS

FIG. 1 is a diagram illustrating an example of an approximate GCD algorithm according to an embodiment;

FIG. 2 is a diagram illustrating an example of an ideal decomposition algorithm according to an embodiment;

DETAILED DESCRIPTION

Figure 3:
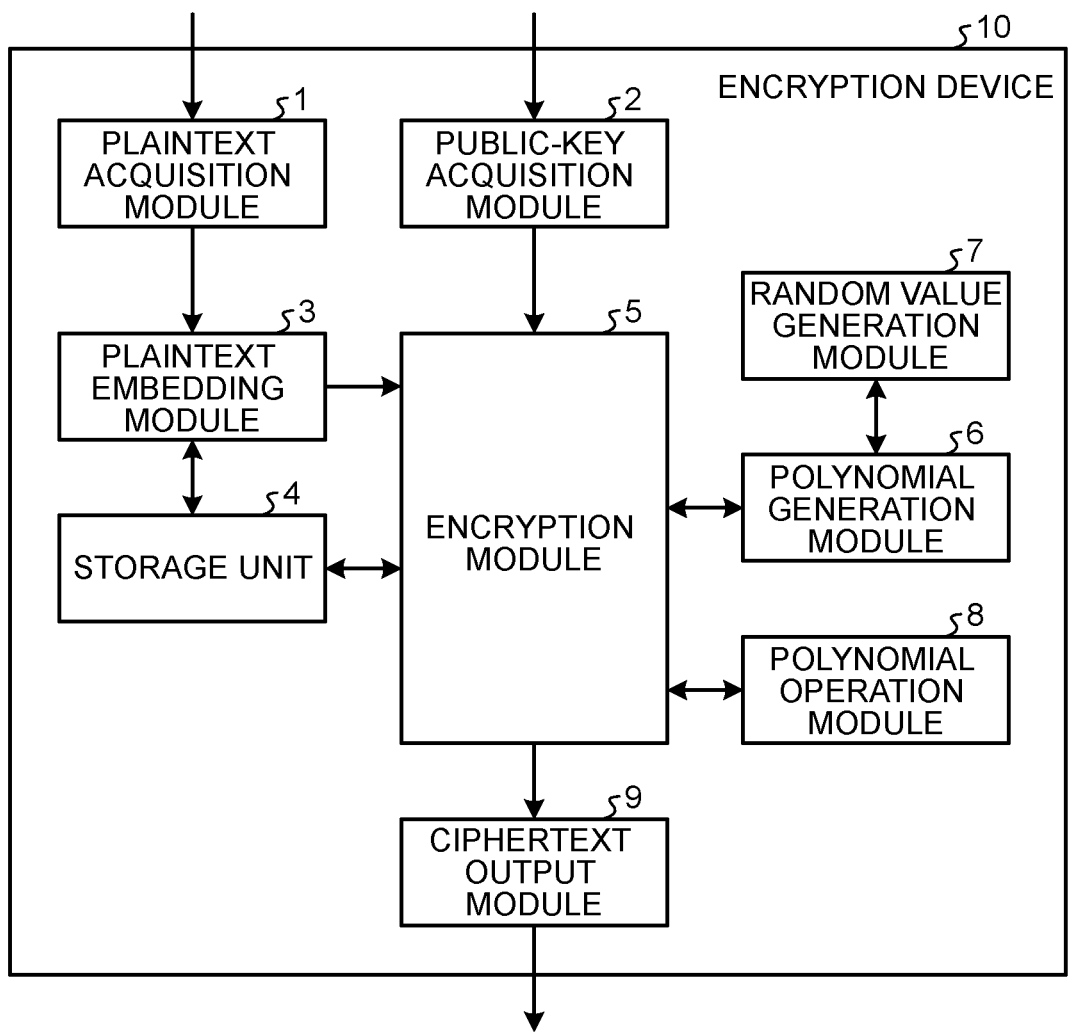
FIG. 3 is a diagram illustrating an example of a functional configuration of an encryption device according to an embodiment.

In general, according to one embodiment, an encryption device includes a memory and one or more processors coupled to the memory. The one or more processors are configured to: acquire, as a public key, an n-variable symmetric indeterminate equation $X(x_1, \ldots, x_n)$ having, as a coefficient, an element of less than or equal to a constant degree of a univariable polynomial ring $F_p[t]$ on a finite field $F_p$ and being symmetric with respect to at least two variables; embed a plaintext M in coefficients of an n-variable plaintext polynomial $m(x_1, \ldots, x_n)$ having an element of less than or equal to a constant degree of the univariable polynomial ring $F_p[t]$ as a coefficient; randomly generate an n-variable polynomial $r(x_1, \ldots, x_n)$ having an element of less than or equal to a constant degree of the univariable polynomial ring $F_p[t]$ as a coefficient, randomly, generate an n-variable symmetric polynomial $s(x_1, \ldots, x_n)$ having an element of less than or equal to a constant degree of the univariable polynomial ring $F_p[t]$ as a coefficient and being symmetric with respect to at least two variables, and randomly generate a noise polynomial $e(x_1, \ldots, x_n)$ having an element of less than or equal to a constant degree of the univariable polynomial ring $F_p[t]$ as a coefficient; and generate a ciphertext $c(x_1, \ldots, x_n)$ by encryption processing of performing an operation including at least one of addition, subtraction, and multiplication of the n-variable polynomial $r(x_1, \ldots, x_n)$, the n-variable symmetric polynomial $s(x_1, \ldots, x_n)$, the noise polynomial $e(x_1, \ldots, x_n)$, and the n-variable symmetric indeterminate equation $X(x_1, \ldots, x_n)$ on the n-variable plaintext polynomial $m(x_1, \ldots, x_n)$.

Exemplary embodiments of an encryption device, a decryption device, a key generation device, an encryption method, a decryption method, a key generation method, a computer program product for encryption, a computer program product for decryption, and a computer program product for key generation will be described below in detail with reference to the accompanying drawings. The present invention is not limited to the following embodiments.

The cryptography can be broadly divided into a common-key cryptography and a public-key cryptography. The common-key cryptography is an encryption scheme based on a data scrambling algorithm, and enables high-speed encryption/decryption, while secret communication and authentication communication can only be performed between two parties having a common key in advance. Public-key cryptography is an encryption scheme based on a mathematical algorithm, and is not as fast in encryption/decryption as common-key cryptography, but it does not require prior key sharing. Public-key cryptography is characterized in that, at the time of communication, secret communication is realized using a public key disclosed by a transmission counterparty, and authentication communication can be performed by applying a digital signature (preventing impersonation) using a private key of a sender.

For this reason, the common-key cryptography is mainly used for encrypting information that needs to be decrypted in real time after reception like paid digital broadcasting, and a method is adopted in which the decryption key is distributed only to the subscriber using a key distribution system called a separate conditional access system. On the other hand, in an online site established on the Internet, it is necessary to encrypt customer information (credit card numbers, addresses; and the like) in order to protect the customer information from eavesdropping, but it is not always possible to issue an encryption key in advance, and thus, public-key cryptography is often used.

Typical public-key cryptography includes RSA cryptography and elliptic curve cryptography. In RSA cryptography, the difficulty of the prime factorization problem serves as the basis of security, and the modulo exponentiation operation is used as an encryption operation. In elliptic curve cryptography, the difficulty of the discrete logarithm problem on an elliptic curve serves as the basis of security, and the point operation on the elliptic curve is used for the encryption operation. Although a decrypting method for a specific key (public key) has been proposed for these public-key cryptography, a general decrypting method is not known, and therefore, no serious problem regarding the security has been found so far except for a decrypting method by a quantum computer described later.

Other examples of the public-key cryptography include knapsack cryptography with the difficulty of the knapsack problem (known as the NP problem) serving as the basis of security, and multivariable cryptography constructed using the field extension theory and with the solving problems of simultaneous equations serving as the basis of security. However, with regard to knapsack cryptography, decrypting methods are already known in almost all implementations, and it cannot be said that the security it provides is quite doubtful.

While powerful attack methods are known for multivariable cryptography, there are also implementations in which the known decrypting methods do not work, so that security is considerably impaired but is not decisive. However, the key size required to avoid known decrypting methods is increasing and is becoming problematic.

On the other hand, even RSA cryptography and elliptic curve cryptography that are currently widely used are exposed to a risk of being decrypted when a quantum computer appears. A quantum computer is a computer that can perform massively parallel calculation (based on a principle different from that of current computers) using a physical phenomenon called entanglement known in quantum mechanics.

Until a few years ago, a quantum computer has been considered to be a virtual computer whose operation has been confirmed only at an experimental level. However, recently, it has been illustrated that the quantum computer has performance exceeding that of a classical computer (quantum exceeding), and efforts to realize the quantum computer have been rapidly advanced. In 1994, Shor showed that an algorithm that efficiently solves prime factorization and discrete logarithm problems can be constructed using this quantum computer. That is, if the quantum computer is realized, the RSA cryptography based on prime factorization and the elliptic curve cryptography based on the discrete logarithm problem (on the elliptic curve) can be decrypted.

Under such circumstances, research on public-key cryptography having a possibility of maintaining security even if a quantum computer is realized has been actively conducted in recent years. Lattice-based cryptography is an example of public-key cryptography that can be realized even at the present time and that is considered to be difficult to break even by a quantum computer. Lattice-based cryptography is public-key cryptography in which a problem (shortest vector problem) of obtaining a point closest to an origin among points other than the origin in a discrete n-dimensional vector space (linear space) called lattice is used as the basis of security.

The shortest vector problem is an NP-hard problem, but since it is a linear problem, small-sized problems can be easily solved. Therefore, the number of dimensions for realizing security is increased, and the key size of a public key, a private key, or the like is increased, and there is little possibility of application to low-end devices in particular. Furthermore, since public-key cryptography requires a larger circuit scale and takes a longer processing time than common-key cryptography, there is a problem that public-key cryptography cannot be implemented in a low-power environment such as a mobile terminal, or it takes a longer processing time even if public-key cryptography is implemented. Therefore, there is a demand for public-key cryptography that can be realized even in a low-power environment.

In general, public-key cryptography is constructed to find computational hard problems (such as a prime factorization problem or a discrete logarithm problem), and decrypt a ciphertext (without knowing a private key) in such a way that is equivalent to solving the computational hard problems. However, conversely, even if one computational hard problem is defined, it is not always possible to easily construct public-key cryptography that uses the problem as the basis of security. This is because, if the security is based on a problem that is too computational hard, a problem of generating a key will be also difficult and public-key cryptography cannot be constructed. On the other hand, if the problem is made easy to the extent that the key can be generated, the decryption will become easy.

Therefore, creativity is thus required to configure public-key cryptography in finding a computational hard problem and to recreate the problem into a problem having an exquisite balance such that it is easy to generate a key but not easy to decrypt (without knowing the generated private key). Since the configuration of this part is difficult, only a few public-key cryptography has been proposed so far. Under such circumstances, public-key cryptography using an algebraic surface (JP 2010-204466 A) has been proposed as public-key cryptography that cannot be efficiently decrypted even by calculation by a quantum computer and that is expected to be processed at high speed even in a low-power environment.

The public-key cryptography of JP 2010-204466 A has a private key as two sections corresponding to an algebraic surface $X(x, y, t)$, a public key as the algebraic surface $X(x, y, t)$, and includes a polynomial generation module and an encryption module. The polynomial generation module performs processing of embedding a plaintext m in a plaintext polynomial $m(x, y, t)$ and processing of generating random polynomials $h(x, y, t)$, $s_1(x, y, t)$, $s_2(x, y, t)$, $r_1(x, y, t)$, and $r_2(x, y, t)$ of three variables x, y, t. The encryption module generates two ciphertexts $c_1 = E_{pk}(m, s_1, r_1, h, X)$ and $c_2 = E_{pk}(m, s_2, r_2, h, X)$ from the plaintext polynomial $m(x, y, t)$ by encryption processing of performing an operation including at least one of addition, subtraction, and multiplication of each polynomial and a-definition expression $X(x, y, t)$. Although the ciphertext has nonlinearity, the public-key cryptography of JP 2010-204466 A is decrypted because there are two ciphertexts and there is no noise term.

In order to reinforce this, JP 2022-77754 A proposes a method in which noise polynomials $e_1$ and $e_2$ are added. Although this method has nonlinearity of taking the product of unknown parts m(x, y)$s_1$(x, y) and m(x, y)$s_2$(x, y) in the ciphertext, there is a problem that a ciphertext length increases because there are two polynomials constituting the ciphertext.

In the following embodiment, in view of such a current situation, public-key cryptography capable of ensuring security even when a quantum computer appears and capable of greatly reducing the ciphertext length by using one polynomial constituting the ciphertext is constructed.

Description of Algebra

First, the algebra used in the embodiment is defined. First, a set of integers is represented by Z, and a remainder of the integer Z at a natural number p is referred to as $Z_p$. Since $Z_p$ is a remainder, and is generally described as follows.

$Z_p$={[0], [1], ..., [p-1]}Here, each element of $Z_p$ satisfies the following properties, so that addition, subtraction, and multiplication are defined.

$$[a]+[b]=[a+b]$$

$$[a]-[b]=[a-b]$$

$$[a]\cdot[b]=[a\cdot b]$$

In this way, a set that can be defined by addition, subtraction, and multiplication, satisfies the associative law, and has an inverse element $[-x]([x]+[-x]=[0])$ that makes the unit element 0 by added to an element x is referred to as a ring. Furthermore, a ring on which the commutative law ($[a]+[b]=[b]+[a]$, $[a]\cdot[b]=[b]\cdot[a]$) is established is referred to as a commutative ring, and in addition, when it has the unit element [1] of the multiplication method, it is referred to as a commutative ring having the unit element.

The division can be defined only for [b] in which an element [x] satisfying $[b]\cdot[x]=[x]\cdot[b]=[1]$ exists, and when such an element [x] exists, [x] is referred to as an inverse element of [b], and is expressed as $[b^{-1}]$. That is, division [a]/[b] for [b] with an inverse element is calculated by multiplying [a] by the inverse element $[b^{-1}]$($[a]\cdot[b^{-1}]$) satisfying the following.

$$[b]\cdot[b^{-1}]=[i]$$

A necessary and sufficient condition for the presence of the inverse element $[b^{-1}]$ in the element [b] of $Z_p$ is GCD(b, p)=1. That is, the element b of $Z_p$ has an inverse element $[b^{-1}]$ when and only when b and p are coprime. For example, when p=5 and b=3, $[3^{-1}]=[2]$ because 3 and 5 are coprime. However, in a case of p=6, GCD(3,6)=3 is obtained, and the elements are not coprime, and there is no inverse element, so that division cannot be realized.

Now, [0] represents a set in which the remainder when divided by p is 0. It can be more explicitly expressed as follows.

$$[0]=\{\ldots,-2p,-p,0,p,2p,\ldots\}$$

When defining the operation for $Z_p$, since the answer is the same regardless of the element of the set [0], it is considered to perform calculation using one representative element (representative element) included in the set [0] for the sake of simplicity. This representative element may be any element as long as it is included in this set (from its properties), but in the embodiment, it is represented by 0 for the sake of simplicity. Similarly, [1] is represented by a minimum positive integer such as 1 and [2] is represented by 2, and $Z_p$ is represented by {0, 1, ..., p-1}.

Here, when p is a prime number, all the representative elements other than 0 are coprime to p, and division can be defined. That is, when p is a prime number, addition, subtraction, multiplication, and division can be defined for $Z_p$. In this manner, a set which is a commutative ring and in which an element other than 0 has an inverse element with respect to a multiplication method is referred to as a field. In particular, a field composed of a finite number of elements such as $Z_p$ where p is a prime number is referred to as a finite field. The cardinality of the finite fields is a prime number or a power of a prime number, and the former is referred to as a prime field. That is, $Z_p$ mentioned herein is a prime field.

Next, the notation and definitions related to polynomials will be described. A set of univariable polynomials having the prime field $F_p$ as a coefficient is described as $F_p[t]$. As can be easily understood, addition, subtraction, and multiplication can be defined for $F_p[t]$, but division of polynomials is not established because there is no inverse element except for a polynomial, including only constant terms.

Notation of Multivariable Polynomial

Next, terms and symbols relating to a bivariable polynomial are defined. First, a bivariable polynomial on the univariable polynomial ring $F_p[t]$ is described by the following formula (1).

$$\xi(x, y) = \sum_{(i,j)\in \Gamma_\xi} \tau_{i,j}(t)x^i y^j \quad (1)$$

Here, $\tau_{i,j}(t)$ is an element of the univariable polynomial ring $F_p[t]$. A set $\gamma_\xi$ is a set of pairs (i(x index), j(y index)) of non-zero monomial exponents included in a polynomial $\xi$(x, y), and is referred to as a term set of a bivariable polynomial $\xi$(x, y).

For example, the term set of the polynomial on $Z_7$ of the following formula (2) is the following formula (3).

$$\xi(x, y) = 5x^3 + 3x^2 y + y^2 + 4x + 1 \quad (2)$$

$$\Gamma_\xi = \{(3, 0), (2, 1), (0, 2), (1, 0), (0, 0)\} \quad (3)$$

Here, the number of elements of $\gamma_\xi$ coincides with the number of monomials of the bivariable polynomial $\xi$(x, y). In addition, in the following description, in a case where it is clear that it is a bivariable polynomial, $\xi$(x, y) may be simply written as $\xi$.

In the embodiment, for the sake of simplicity, the term set of the D-degree bivariable polynomial is defined as the maximum term set, and expressed as $\gamma_D$. That is, when D=2, the following formula (4) is obtained, and when D=3, the following formula (5) is obtained.

$$\Gamma_2 = \{(2, 0), (1, 1), (0, 2), (1, 0), (0, 1), (0, 0)\} \quad (4)$$

$$\Gamma_3 = \{(3, 0), (2, 1), (1, 2), (0, 3), (2, 0), (1, 1), \\ (0, 2), (1, 0), (0, 1), (0, 0)\} \quad (5)$$

The $\gamma_3$ includes the term set $\gamma_\xi$ of the above-described formula (3) as a subset.

When the term set $\gamma_D$ is given, a set of bivariable polynomials on a univariable polynomial ring $F_p[t]$ having the term set $\gamma_D$ is defined by the following formula (6)

$$\mathcal{F}_{\Gamma_D}/\mathbb{F}_p[t] = \{f \in \mathbb{F}_p[x, y] \mid f = \sum_{(i,j) \in \Gamma_D} a_{i,j}(t)x^i y^j\} \quad (6)$$

Here, $a_{i,j}(t)$ is an element on $F_p[t]$. The left side of the above-described formula (6) may be simply written as $F_{\gamma D}$. In addition, a case where the degree of the coefficient $a_{i,j}(t)$ is limited to d or less is represented by the following formula (7), and similarly, it may be simply written as $F_{\gamma D, d}$. Note that the German letter F in the numerator on the left side of the formulas (6) and (7) is cited as an ordinary alphabet capital letter F in the sentence.

$$\mathcal{F}_{\Gamma_D,d}/\mathbb{F}_p[t] = \{f \in \mathbb{F}_p[x, y] \mid f = \sum_{(i,j) \in \Gamma_D} a_{i,j}(t)x^i y^j \text{ s.t. } \deg a_{i,j}(t) \leq d\} \quad (7)$$

The bivariable polynomial on the univariable polynomial ring $F_p[t]$ is expressed by the following formula (8) as a trivariable polynomial.

$$\xi(x, y) = \sum_{(i,j,k) \in \Delta_\xi} \mu_{i,j,k} x^i y^j t^k \quad (8)$$

Here, $\mu_{i, j, k}$ is an element of the finite field $F_p$. A set $\Delta_\xi$ is a set of pairs (i(x index), j(y index), k(t index)) of non-zero monomial exponents included in a polynomial $\xi(x, y, t)$, and is referred to as a term set of a trivariable polynomial $\xi(x, y, t)$.

For example, the term set of the polynomial (9) on $F_7$ is expressed by the following formula (10).

$$\xi(x, y) = (t^2 + 2t + 6)x^2 + (3t + 5)y^2 + (4t^2 + 1)x + 4t^2 + t + 3 \quad (9)$$

$$\Delta_\xi = \{(2, 0, 2), (2, 0, 1), (2, 0, 0), (0, 2, 1), \quad (10)$$
$$(0, 2, 0), (1, 0, 2), (1, 0, 0), (0, 0, 2), (0, 0, 1), (0, 0, 0)\}$$

Here, the number of elements of $\Delta_\xi$ coincides with the number of monomials of the trivariable polynomial $\xi(x, y, t)$. In addition, in the following description, in a case where it is clear that it is a trivariable polynomial, $\xi(x, y, t)$ may be simply written as 4.

Note that the notation of the maximum term set follows the notation of the bivariable polynomial, and the maximum term set in which the degree of each coefficient $a_{i,j}(t)$ is limited to d or less in the degree D regarding x and y of the trivariable polynomial is described as $\Delta_{D, d}$.

For example, in a case of D=2 and d=1, the following formula (11) is obtained.

$$\Delta_{2,1} = \{(2, 0, 1), (2, 0, 0), (1, 1, 1), (0, 2, 1), \quad (11)$$
$$(1, 0, 1), (1, 0, 0), (0, 1, 1), (0, 1, 0), (0, 0, 1), (0, 0, 0)\}$$

Solution and Zero-Point

A pair of elements $(u_x(t), u_y(t))$ on the univariable polynomial ring $F_p[t]$ satisfying the equation $X(x, y)=0$ on the univariable polynomial ring $F_p[t]$ is referred to as a solution of the equation $X(x, y)=0$. When $X(x, y)$ is regarded as a polynomial, the solution of the equation $X(x, y)=0$ is referred to as a zero-point of $X(x, y)$.

Approximate GCD Calculation for Univariable Polynomial

It is assumed that polynomials $f_1(t)=s(t)e_1(t)$ and $f_2(t)=s(t)e_2(t)$ of a univariable polynomial ring $F_p[t]$ are given.

At this time, when $e'(t):=GCD(e_1(t), e_2(t))$, the greatest common divisor (GCD) s (t) e'(t) of $f_1(t)$ and $f_2(t)$ is obtained by Euclidean tautomerism. Here, calculation (approximate GCD calculation) for deriving GCDs(t)e'(t) from the following formula (12) in which small-degree noises $a_1(t)$ and $a_2(t)$ are respectively added to $f_1(t)$ and $f_2(t)$ will be described.

$$\begin{cases} f_1(t) = s(t)e_1(t) + a_1(t) \\ f_2(t) = s(t)e_2(t) + a_2(t) \end{cases} \quad (12)$$

This calculation plays an important role in decryption of the encryption scheme illustrated in the present embodiment. It is known that GCDs(t)e'(t) can be obtained by Algorithm 1 illustrated in FIG. 1 when the condition of the following formula (13) is satisfied in the formula (12).

$$\begin{cases} \deg s(t)e'(t) \geq 2\deg e_k(t)/e'(t) \\ \deg e_k(t)/e'(t) > \deg a_k(t) \end{cases} (k = 1, 2) \quad (13)$$

Since the algorithm illustrated in FIG. 1 uses the Euclidean algorithm, efficient processing is possible. In the present embodiment, s(t)e'(t) is referred to as approximate greatest common divisor (GCD) of $f_1(t)$ and $f_2(t)$. Here, n is a system parameter and is a natural number equal to or larger than degGCD($e_1(t)$, $e_2(t)$). If n<degGCD($e_1(t)$, $e_2(t)$), the approximate GCD calculation fails.

Ideal Decomposition of Multivariable Polynomial

A factorization (ideal decomposition) problem using an ideal in the multivariable polynomial ring $F_p[t][x, y]$ will be defined, and one solution algorithm thereof will be described. The ideal decomposition is a problem of obtaining $h_j(\in F_p[t][x, y])$ (j=1, ..., n) when two elements X and f ($=\Pi_{j=1}^n h_j+x_r$) of $F_p[t][x, y]$ are given. Here, r is also an element of $F_p[t][x, y]$, and is a so-called factorization problem of the polynomial f in the remainder ring $F_p[t][x, y]/(X)$.

A finite set of the multivariable polynomial ring $F_p[t][x, y]$ is referred to as $G=\{g_1, \ldots, g_s\}$. At this time, it is known that a polynomial $q_i(h_j \in F_p[t][x, y])$ exists for an arbitrary polynomial $f(\in F_p[t][x, y])$, and LM(r) is not dividable by LM($g_1$) for r=0 or an arbitrary i in the following formula (14).

$$r = f \sum_{i=1}^{s} q_i g_i \quad (14)$$

Here, LM($g_i$) and LM(r) mean monomials that come first in the monomial order defined in the multivariable polynomial ring $F_y[t]$. For example, when the order of x>y>t is defined, the degree of monomials is prioritized in the degree of x, y, and t, and in the case of monomials containing the same variables, those having higher exponents come first in this order. When the polynomial of the formula (9) is r, the monomial degree of r is $t^2x^2$, $2tx^2$, $6x^2$, $4t^2x$, x, $3ty^2$, $5y^2$, $4t^2$, t, 3, and LM(r)=$t^2x^2$.

Using the finite set G, transforming f as in the above-described formula (14) is referred to as normalization of f by G, and r is referred to as a normal form of G and written as $NF_G(f)$. In addition, when the set G is set to a set called a Groebner basis for the ideal J of a polynomial, a normal form of an arbitrary element f included in the ideal J becomes 0. That is, it is known that it can be written as in the following formula (15).

$$f - \sum_{i=1}^{s} q_i g_i = 0 \qquad (15)$$

Here, $q_i$ is an element of $F_p[t][x, y]$.

It is known that the following formula (16) is obtained by calculating a termination formula of f and X.

$$Res_x(f, X) = Res_x(\prod_{k=1}^{n} h_k + Xr, X) = Res_x(\prod_{k=1}^{n} h_k, X) = \prod_{k=1}^{n} Res_x(h_k, X) \qquad (16)$$

Here, $Res_x(f, X)$ is a termination formula relating to a variable x. Here, also for the variable y, the termination formula can be similarly calculated by the following formula (17).

$$Res_y(f, X) = \prod_{k=1}^{n} Res_y(h_k, X) \qquad (17)$$

Here, the ideal J is defined by the following formula (18).

$$J = (X, Res_x(h_j, X), Res_y(h_j, X)) \qquad (18)$$

Since J substantially matches $(h_j, X)$ and $h_j \in J$, the Groebner basis G of the ideal J is calculated, and a normal form of $h_j$ under G is calculated to be 0. Here, $h_j$ is simply written as h for the sake of simplicity, and h is represented by the following formula (19).

$$h = \sum_{(i,j,k) \in \Delta_h} \mu_{ijk} x^i y^j t^k \qquad (19)$$

Here, $\mu_{ijk}$ is a variable having $F_p$ as a value. When the normal form of h in G is calculated, the following formula (20) is obtained.

$$NF_G(h) = \sum_{(i,j,k) \in \Delta_h} \mu_{ijk} NF_G(x^i y^j t^k) = 0 \qquad (20)$$

"h" can be restored by deriving simultaneous linear equations by comparing the coefficients of $x^i y^j t^k$ on both sides and solving the equations to obtain $\mu_{ijk}$.

On the other hand, actually, $Res_x(h_i, X)$ and $Res_y(h_i, X)$ are factors of $Res_x(f, X)$ and $Res_y(f, X)$, respectively, and $h_i$ is not restored unless they are a correct combination. Considering those points, it can be seen that the ideal decomposition is realized by Algorithm 2 illustrated in FIG. 2.

Indeterminate Equation and its Solving Problem

The indeterminate equation can be defined as an equation in which the number of variables is larger than the number of equations (included in the equation). Since an indeterminate equation has a small number of constraints and a high degree of freedom of solution, if the indeterminate equation has a solution, there are a plurality of (in some cases, finite) solutions in many cases (this means "indeterminate"). Actually, there are an infinite number of real solutions (or complex solutions) of the indeterminate equation with integer coefficients, and it is easy to obtain some of them as approximate solutions. On the other hand, such a method cannot be usually used for an equation having a solution in a discrete set such as an integer solution of an indeterminate equation with integer coefficients. Therefore, although some theoretical narrowing is required, it is known that, in general, the presence or absence of a solution cannot be determined by a finite number of steps even if such narrowing is performed (unsolvable problem).

The indeterminate equation cryptography proposed in the embodiment is based on a solving problem for obtaining a univariable polynomial solution of the indeterminate equation X(x, y)=0 defined on the univariable polynomial ring $F_p[t]$, and this problem is defined as follows.

Definition 1 (Solving Problem of Indeterminate Equation on Univariable Polynomial Ring $F_p[t]$)

When the indeterminate equation X(x, y)=0 defined on the univariable polynomial ring $F_p[t]$ is given, the problem of obtaining the solution $(u_x(t), u_y(t))$ on $F_p[t]$ is referred to as a solving problem of the indeterminate equation on the univariable polynomial ring $F_p[t]$ or a solving problem on the algebraic surface X(x, y) defined on the finite field $F_p$.

Hereinafter, an example of the indeterminate equation cryptography of the present embodiment will be described. In addition, in the following algorithm, a small numerical example is added for the purpose of assisting understanding, but it should be noted that security of cryptography cannot be maintained in this numerical example.

Parameters

Symbols and parameters used in the method of the present embodiment will be described. The following symbols are defined for the bivariable polynomial $\xi(x, y)$ on $F_p[t]$.

$D_\xi$: Total degree with respect to x, y of $\xi(x, y)$ $d_\xi$: Degree of coefficient polynomial of $\xi(x, y)$ In the method of the present embodiment, a bivariable polynomial on five polynomials $F_p[t]$ illustrated in the following formula (21) is used.

$$X(x, y), m(x, y), s(x, y), e(x, y), r(x, y) \in F_p[t][x, y]. \qquad (21)$$

Among them, X(x, y) is a polynomial having $(u_x(t), u_y(t))$ as a zero-point, the zero-point satisfies $\deg u_x(t) = \deg u_y(t)$, and this degree is written as d. The parameters of the cryptography of the present embodiment are p, d, $D_\xi$, and $d_\xi$ (=X, m, s, e, r).

Hereinafter, a condition of the following formula (22) is assumed for decryption.

$$\begin{cases} D_s d + d_s \geq 2(D_e d + d_e) \\ D_e d + d_e > D_m d + d_m \\ d \geq 3(d_m + 1) \end{cases} \qquad (22)$$

In the present embodiment, since $D_m = 3$, $D_x = D_s = 2$, and $D_e = D_r = 1$, the condition of the above-described formula (22) is the following formula (23).

$$\begin{cases} d_s \geq 2d_e \\ d + d_e > 3d + d_m \\ d \geq 3(d_m + 1) \end{cases} \quad (23)$$

Further, in the present embodiment, since the degree of the constant term of X, s is different from the degrees of other terms, the degrees are written as $d_{x,0}$ and $d_{s,0}$, and are separately defined by the following formula (24).

$$d_{X,0} = d_X + d, \; d_{s,0} = d_s + d \quad (24)$$

Key Generation Algorithm

In the key generation of the scheme of the present embodiment, p, d, $D_x$, and $d_x$ among the above-described parameters are used as inputs. These parameters are parameters directly related to the security of encryption, and are determined on the basis of the amount of calculation required for the attack technique described in [Examination of security] described later. In the numerical example, p=5, d=6, $D_x^{=2}$, and $d_x$=d−1=5.

1. Generation of Private Key

Two d-degree polynomials $u_x(t)$, $u_y(t)$ of the polynomial ring $F_p[t]$ are generated uniformly at random, and, for example, a private key (x, y)=($u_x(t)$, $u_y(t)$) of the following formula (25) is generated.

$$(u_x(t), u_y(t)) = \left(4t^6 + 2t^5 + t^4 + 2t^3 + 2t^2 + 1, \; 4t^6 + t^5 + 4t^4 + t^2 + 4t + 1\right) \quad (25)$$

2. Generation of Coefficients of Public Key

A $d_x$-degree polynomial $\tau_{i,j}(t)$ (i+j=v) which is a coefficient of the public key X(x, y) is generated uniformly at random. Here, it is assumed that $\tau_{i,j}(t)=\tau_{j,i}(t)$ so that X(x, y) is a symmetric equation. Here, since $d_x$=5, it is generated as the following formula (26).

$$\tau_{2,0}(t) = \tau_{0,2}(t) = t^5 + 4t^4 + 4t^3 + 4t^2 + 4t + 3 \quad (26)$$
$$\tau_{1,1}(t) = 3t^5 + 2t^4 + t^3 + t^2 + 3t + 4$$
$$\tau_{1,0}(t) = \tau_{0,1}(t) = 3t^5 + 4t^4 + 3t^3 + 3t^2 + 2t + 3$$

3. Calculation of Provisional Constant Term of Public Key

A provisional constant term of the public key is calculated b the following formula (27).

$$T_{0,0}(t) := -\sum_{1 \leq i+j \leq 2} T_{i,j}(t) \cdot u_x(t)^i u_y(t)^j \quad (27)$$

Specifically, in the above-described example, it is calculated by the following formula (28).

$$T_{0,0}(t) = 2t^{17} + 4t^{15} + 2t^{14} + 4t^{13} + 3t^{12} + \quad (28)$$
$$2t^{10} + 3t^9 + t^7 + 3t^6 + 2t^5 + 2t^4 + 4t^3 + 2t^2 + 2t + 3$$

Here, when X(x, y) is defined by the following formula (29), ($u_x(t)$, $u_y(t)$) is a solution of X(x, y)=0.

$$X(x, y) := X(x, y) + T_{0,0}(t) = 0 \quad (29)$$

On the other hand, since the provisional constant term in the above-described formula (27) has the degree of $d_x$+2d and is larger than $d_{x,0}$=$d_x$+d, the coefficients are adjusted as follows.

4. Adjustment of Degree of Coefficient

When a quotient obtained by dividing the provisional constant term of the above-described formula (27) by $u_x(t)$ $u_y(t)$ is q(t), the following formula (30) also has the same ($u_x(t)$, $u_y(t)$) as a solution.

$$X(x,y)+q(t)xy-q(t)u_x(t)u_y(t)=0 \quad (30)$$

Here, degq(t)=$d_x$. The constant term is expressed by the following formula (31).

$$T_{0,0}(t) - q(t)u_x(t)u_y(t) \quad (31)$$

This agrees with the following formula (32), and thus the degree is $d_x$+d or less.

$$T_{0,0}(t) \bmod u_x(t)u_y(t) \quad (32)$$

Therefore, deg$\tau_{1,1}$=$d_x$ is also satisfied by this modification. Therefore, by updating X(x, y) to the following formula (33), deg$\tau_{0,0}(t)$=2d−1=$d_{x,0}$ is obtained, and conversion into an indeterminate equation satisfying the conditions of the public key can be performed.

$$X(x, y) := X(x, y) + q(t)xy - q(t)u_x(t)u_y(t) \quad (33)$$

In this example, q(t) is the following formula (34), and the public key X is updated to the following formula (35). The degree of the constant term is $d_x$+d=11.

$$q(t) = 3t^5 + 4t^4 + 2t^3 + 2 \quad (34)$$

$$X = (t^5 + 4t^4 + 4t^3 + 4t^2 + 4t + 3)x^2 + \quad (35)$$
$$(3t^5 + 2t^4 + t^3 + t^2 + 3t + 4)xy + (t^5 + 4t^4 + 4t^3 + 4t^2 + 4t + 3)y^2 +$$
$$(3t^5 + 4t^4 + 3t^3 + 3t^3 + 3t^2 + 2t + 3)x +$$
$$(3t^5 + 4t^4 + 3t^3 + 3t^3 + 3t^2 + 2t + 3)y + 2t^{11} + 4t^{10} +$$
$$3t^9 + 4t^8 + t^7 + 2t^6 + t^5 + 2t^4 + 2t^3 + t^2 + 3t + 4$$

Here, the term xy of which the coefficients are changed is a term in which x and y are symmetric, and there is no change in that X(x, y) is a symmetric equation even if the degree of the coefficient is adjusted.

Encryption Algorithm

Next, an encryption algorithm will be described. In the present embodiment, a plaintext M (message M) is quinary-expanded as follows.

$(31223041112230202043)_5$

Then, the quinary-expanded plaintext M is embedded in a coefficient of a plaintext polynomial m(x, y) satisfying the following formula (36)

$$deg_{x,y} m(x, y) = 3, deg_t m(x, y) = d_m \tag{36}$$

Here, when $d_m=1$, the quinary-expanded plaintext M is embedded as in the following formula (37).

$$m(x, y) = (3t+1)x^3 + (2t+2)x^2y + 3txy^2 + \\ (4t+1)y^3 + (t+1)x^2 + (2t+2)xy + 3ty^2 + 2tx + 2ty + 4t + 3 \tag{37}$$

This plaintext polynomial m(x, y) is encrypted as follows:

1. Generation of Polynomial s(x, y)

A $d_s$-degree polynomial $s_{i,j}(t)$ ($0 \le i+j \le 2$) which is a coefficient of the polynomial s(x, y) is generated uniformly at random. Note that it is assumed that $s_{i,j}(t)=s_{j,i}(t)$ so that s(x, y) is symmetric. In this example, assuming that $d_s=28$, s(x, y) is generated as in the following formula (38).

$$s(x, y) = \tag{38}$$
$$(4t^{28} + 2t^{27} + 3t^{26} + 2t^{25} + 4t^{24} + 4t^{23} + 4t^{22} + 3t^{21} + 2t^{20} + 4t^{19} +$$
$$4t^{18} + t^{16} + t^{15} + 3t^{14} + 2t^{13} + t^{12} + 3t^{11} + 2t^{10} +$$
$$t^9 + 2t^8 + 2t^7 + 4t^6 + t^5 + 4t^4 + t^3 + 4t^2 + 3t + 2)x^2 +$$
$$(4t^{26} + 3t^{25} + 3t^{24} + 3t^{23} + 3t^{22} + t^{21} + 2t^{20} + 3t^{19} + 4t^{18} + 3t^{17} +$$
$$4t^{16} + 4t^{12} + 2t^{11} + t^{10} + 2t^9 + 4t^7 + 4t^6 + 3t^5 + 3t^4 + t^3 + t^2 + t)xy +$$
$$(4t^{28} + 2t^{27} + 3t^{26} + 2t^{25} + 4t^{24} + 4t^{23} + 4t^{22} + 3t^{21} + 2t^{20} +$$
$$4t^{19} + 4t^{18} + t^{16} + t^{15} + 3t^{14} + 2t^{13} + t^{12} + 3t^{11} + 2t^{10} +$$
$$t^9 + 2t^8 + 2t^7 + 4t^6 + t^5 + 4t^4 + t^3 + 4t^2 + 3t + 2)y^2 +$$
$$(t^{28} + t^{27} + t^{26} + 2t^{24} + 3t^{23} + 3t^{21} + 2t^{20} + t^{19} + t^{16} + 2t^{15} +$$
$$t^{14} + t^{13} + 4t^{11} + t^{10} + 4t^9 + t^7 + 4t^6 + 2t^5 + 3t^4 + 2)x +$$
$$(t^{28} + t^{27} + t^{26} + 2t^{24} + 3t^{23} + 3t^{21} + 2t^{20} + t^{19} + t^{16} + 2t^{15} +$$
$$t^{14} + t^{13} + 4t^{11} + t^{10} + 4t^9 + t^7 + 4t^6 + 2t^5 + 3t^4 + 2)y +$$
$$t^{33} + 4t^{32} + t^{30} + t^{29} + 2t^{28} + 2t^{27} + 2t^{26} + 2t^{25} + 4t^{24} +$$
$$3t^{23} + 3t^{22} + 4t^{21} + 3t^{20} + 3t^{18} + t^{17} + 4t^{16} +$$
$$3t^{15} + 3t^{14} + 4t^{13} + 2t^{12} + 3t^{11} + t^{10} + 2t^9 +$$
$$3t^8 + 2t^7 + t^6 + 4t^5 + 2t^4 + 4t^3 + 2t^2 + 3t + 2$$

2. Generation of Noise Polynomial e(x, y)

A first-degree bivariable polynomial e(x, y) having coefficients of the $d_e$-degree or less is generated. In this example, when $d_e=14$, e(x, y) is generated as in the following formula (39).

$$e(x, y) = (3t^{13} + t^{12} + 2t^{11} + 3t^{10} + 4t^9 + 2t^8 + 4t^6 + 4t^5 + 2t^2 + 3)x + \tag{39}$$
$$(4t^{14} + 4t^{13} + 4t^{12} + 3t^{11} + 3t^{10} + 4t^9 + 2t^8 + t^5 + 2t^4 + t + 1)y + 4t^{13} +$$
$$t^{12} + 3t^{11} + 4t^{10} + 2t^9 + 2t^8 + 2t^7 + 3t^6 + t^5 + t^4 + 4t^3 + t^2 + 3t + 3$$

3. Generation of Random Polynomial r(x, y)

A first-degree bivariable random polynomial r(x, y) having a coefficient of the $d_r$-degree or less is generated. In this example, when $d_r=37$, r(x, y) is generated as in the following formula (40).

$$r(x, y) = \tag{40}$$
$$(4t^{37} + 4t^{36} + 2t^{35} + 4t^{34} + 2t^{33} + t^{31} + 3t^{30} + 2t^{29} + 3t^{28} + 4t^{27} +$$
$$3t^{26} + 4t^{25} + t^{23} + 2t^{20} + t^{19} + 3t^{16} + 3t^{14} + t^{13} + 2t^{12} +$$
$$2t^{11} + 4t^{10} + t^9 + 4t^8 + 4t^7 + 2t^6 + t^3 + 4t^2 + 2t + 1)x +$$
$$(4t^{37} + 3t^{36} + t^{33} + 3t^{32} + 2t^{31} + 2t^{30} + 4t^{29} + 4t^{28} + 4t^{27} + 4t^{26} +$$
$$4t^{25} + 3t^{23} + 4t^{22} + 3t^{20} + 3t^{19} + 3t^{18} + 2t^{16} + 3t^{15} + 2t^{13} + 3t^{12} +$$
$$3t^{11} + 4t^{10} + 4t^9 + t^8 + t^7 + 4t^6 + t^5 + 4t^4 + 4t^2 + 4t + 2)y +$$
$$t^{37} + 3t^{36} + 4t^{34} + 4t^{33} + 2t^{32} + t^{31} + t^{30} + 4t^{29} + t^{28} +$$
$$t^{27} + t^{26} + 4t^{25} + 3t^{23} + t^{22} + 3t^{20} + 3t^{19} +$$
$$4t^{17} + 3t^{16} + 4t^{15} + 3t^{14} + 4t^{13} + t^{11} + t^{10} +$$
$$4t^9 + 3^8 + 3t^7 + t^6 + t^5 + t^4 + t^3 + 3t + 3$$

4. Generation of Ciphertext c(x, y)

The ciphertext is calculated by the following formula (41).

$$c(x, y) = s(x, y)e(x, y) + X(x, y)r(x, y) + m(x, y) \tag{41}$$

In this example, c(x, y) is calculated as in the following formula (42).

$$c(x, y) = \tag{42}$$
$$(4t^{42} + 2t^{41} + 4t^{40} + 3t^{39} + 3t^{38} + 2t^{37} + 3t^{35} + t^{34} + t^{32} + 2t^{31} +$$
$$t^{30} + 3t^{27} + 3t^{26} + 4t^{25} + 4t^{25} + 3t^{23} + 3t^{22} + 4t^{21} +$$
$$3t^{20} + t^{19} + 4t^{18} + 3t^{17} + 2t^{16} + 4t^{15} + 3t^{14} + 4t^{13} +$$
$$2t^{12} + 2t^{11} + 2t^{10} + 4t^9 + 4t^7 + 3t^6 + 2t^5 + 2t^4 + 2t)x^3 +$$
$$(2t^{42} + 3t^{41} + 2t^{40} + 4t^{39} + 3t^{38} + 2t^{36} + t^{34} + 3t^{32} + 2t^{31} +$$
$$t^{30} + 4t^{29} + 2t^{27} + t^{26} + 3t^{25} + 4t^{24} + t^{23} + 2t^{22} + 3t^{21} +$$
$$2t^{20} + t^{19} + 4t^{18} + 3t^{17} + 4t^{16} + 4t^{15} + 2t^{14} + t^{12} + t^{11} +$$
$$2t^{10} + 3t^9 + 3t^8 + 3t^7 + 2t^6 + 2t^4 + 2t^3 + t^2 + t + 4)x^2y +$$
$$(t^{42} + 4t^{41} + 3t^{39} + t^{38} + t^{37} + 2t^{36} + 4t^{35} + 2t^{34} + 3t^{33} + t^{32} + 4t^{30} +$$
$$2t^{29} + t^{28} + 2t^{26} + 4t^{24} + 4t^{23} + 3t^{22} + 4t^{20} + 3t^{19} + 2t^{17} + 2t^{16} + 3t^{15} +$$
$$3t^{14} + 2t^{13} + 3t^{12} + t^{11} + 3t^{10} + 4t^9 + t^7 + 4t^6 + t^3 + 2t^2 + 2)xy^2 +$$
$$(3t^{41} + 4t^{40} + 3t^{39} + 3t^{38} + 2t^{37} + t^{36} + 4t^{35} + t^{32} + 4t^{31} + 4t^{30} +$$
$$t^{29} + t^{28} + 4t^{26} + t^{25} + 3t^{24} + 2t^{23} + t^{22} + t^{21} + 2t^{20} + 4t^{16} + t^{15} +$$
$$t^{14} + t^{13}t^{12} + 3t^{10} + 4t^9 + 4t^8 + t^7 + 2t^6 + 2t^5 + 3t^3 + 4t + 4)y^3 +$$
$$(3t^{42} + 4t^{41} + t^{40} + t^{39} + 3t^{38}3t^{37} + 2t^{36} + 4t^{35} + 2t^{34} + t^{33} + 4t^{32} +$$
$$4t^{31} + 3t^{30} + t^{28} + 2t^{25} + 4t^{24} + 2t^{23} + 2t^{22} + 3t^{21} + 4t^{20} + 2t^{19} + t^{17} +$$
$$t^{16} + 3t^{15} + 4t^{14} + t^{13} + t^{11} + 3t^{10} + t^9 + 2t^8 + 2t^7 + t^6 + 3t^5 + 2t^4 + 3t^3)$$
$$x^2 + (t^{42} + t^{40} + 4t^{39} + 4t^{38} + 3t^{36} + 2t^{30} + 4t^{29} + 3t^{28} + t^{27} + 4t^{26} +$$
$$2t^{25} + 3t^{24} + 2t^{22} + t^{21} + 2t^{19} + 4t^{18} + t^{17} + 3t^{16} + 3t^{15} + 3t^{14} + 2t^{13} +$$

-continued $$(t^{12} + 3t^{11} + t^9 + 2t^8 + 2t^7 + 3t^6 + 4t^5 + 2t^4 + 3t^3 + 4t^2 + 2t + 1)xy +$$

$$(2t^{42} + t^{41} + 4t^{40} + 3t^{39} + 2t^{38} + 3t^{37} + 4t^{36} + 2t^{34} + 3t^{33} + 2t^{32} + t^{31} +$$

$$4t^{30} + 2t^{29} + 2t^{27} + 3t^{25} + 4t^{24} + 4t^{23} + 3t^{22} + 3t^{20} + t^{17} + 4t^{16} + 4t^{15} +$$

$$4t^{14} + 2t^{13} + 3t^{12} + t^{11} + 4t^{10} + 3t^9 + 2t^8 + 3t^7 + 2t^6 + 4t^3 + 2t + 3)y^2 +$$

$$(t^{42} + 2t^{41} + 3t^{40} + t^{39} + t^{37} + 3t^{36} + t^{35} + 4t^{34} + 4t^{33} + 3t^{32} +$$

$$3t^{31} + t^{30} + 2t^{28} + 2t^{27} + 4t^{25} + 3t^{24} + t^{23} + 3t^{22} + 3t^{20} + 2t^{19} + 3t^{18} +$$

$$2t^{17} + 3t^{16} + 4t^{15} + 2t^{14} + 4t^{13} + 4t^9 + 4t^8 + t^7 + t^6 + 3t^5 + 2t^3 + 3t)x +$$

$$(4t^{42} + 4t^{41} + 2t^{40} + 2t^{39} + t^{38} + 2t^{37} + 4t^{35} + t^{34} + 3t^{33} +$$

$$3t^{32} + t^{31} + 2t^{30} + 2t^{29} + t^{28} + 4t^{26} + 3t^{25} + 4t^{24} + 3t^{23} +$$

$$3t^{22} + 2t^{21} + 2t^{19} + 3t^{18} + 2t^{17} + 2t^{16} + 2t^{15} + t^{14} + 4t^{13} +$$

$$4t^{12} + 4t^{11} + t^{10} + t^9 + 4t^8 + 3t^5 + t^4 + 3t^3 + 4t^2)y +$$

$$3t^{42} + 4t^{41} + 4t^{39} + t^{38} + 4t^{34} + 3t^{33} + 4t^{32} + 4t^{31} + t^{30} +$$

$$3t^{29} + 3t^{28} + t^{27} + t^{26} + t^{25} + 3t^{24} +$$

$$3t^{23} + 4t^{22} + 4t^{19} + t^{18} + 4t^{14} +$$

$$t^{13} + 3t^{12} + 4t^{11} + 4t^{10} + 4t^9 + t^8 +$$

$$4t^7 + 3t^6 + 2t^5 + 3t^4 + 2t^3 + 4t^2 + 1$$

Decryption Algorithm

Note that there is a relationship of $X(u_x(t), u_y(t))=0$ when the minimum solution $u:(x, y)=(u_x(t), u_y(t))$ is substituted into the indeterminate equation $X(x, y)$. The decryption algorithm is as follows:

1. Substitution of Solution u into Ciphertext c(x, y) and its Inverse Expression c(y, x)

The following formula (43) is obtained by substituting the solution u into c(x, y) and c(y, x).

$$\begin{cases} c(u_x(t), u_y(t)) = s(u_x(t), u_y(t))e(u_x(t), u_y(t)) + \\ \quad m(u_x(t), u_y(t)) \\ c(u_y(t), u_x(t)) = s(u_x(t), u_y(t))e(u_y(t), u_x(t)) + \\ \quad m(u_y(t), u_x(t)) \end{cases} \quad (43)$$

Note that $s(x, y)=s(y, x)$, and $X(x, y)=X(y, x)$. In this example, $c(u_x(t), u_y(t))$ and $c(u_y(t), u_x(t))$ are calculated as in the following formula (44).

$$c(u_x(t), u_y(t)) = \quad (44)$$

$$3t^{60} + t^{59} + t^{58} + t^{55} + 4t^{54} + 3t^{53} + 3t^{52} + 4t^{51} + 3t^{50} + 3t^{49} + t^{48} +$$

$$2t^{46} + t^{45} + 2t^{42} + 2t^{40} + 2t^{39} + 2t^{38} + 2t^{36} + 2t^{33} + 2t^{32} + 2t^{31} + 2t^{30} +$$

$$3t^{28} + 3t^{26} + 4t^{25} + 4t^{24} + 3t^{21} + 3t^{20} + 2t^{19} + t^{17} + 2t^{16} + 3t^{15} +$$

$$4t^{14} + 4t^{13} + 2t^{12} + 4t^{11} + 2t^{10} + 3t^9 + t^8 + t^6 + 3t^5 + 2t^3 + 2t^2 + 2t$$

$$c(u_y(t), u_x(t)) + 3t^{60} + 3t^{59} + 3t^{58} + t^{57} + 2t^{56} + 3t^{53} + 4t^{52} + 4t^{51} + t^{50} +$$

$$3t^{49} + 3t^{47} + 3t^{44} + 2t^{43} + 3t^{42} + 2t^{41} + t^{40} + 4t^{39} + t^{38} + t^{37} + 4t^{35} + 2t^{34} +$$

$$3t^{33} + 2t^{32} + 4t^{31} + 3t^{30} + t^{29} + 2t^{28} + 2t^{27} + 4t^{26} + 2t^{25} + 3t^{23} + 3t^{21} +$$

$$3t^{18} + 4t^{17} + 2t^{15} + 3t^{14} + 3t^{13} + 4t^{12} + 3t^8 + 2t^7 + t^6 + t^4 + 3t^3 + t^2 + 3t$$

2. Calculation of $s(u_x(t), u_y(t))$ by Approximate GCD calculation

This is obtained by Algorithm 1 (FIG. 1) under the condition of the above-described formula (13). In this example, calculation is performed as in the following $$s(u_x(t), u_y(t)) = t^{40} + t^{38} + 3t^{37} + t^{35} + 2t^{33} + 4t^{32} + \quad (45)$$

$$t^{31} + 3t^{29} + 2t^{26} + 2t^{25} + 2t^{23} + t^{22} + t^{21} + 2t^{20} + 4t^{19} +$$

$$4t^{16} + 4t^{14} + t^{13} + 3t^{12} + 3t^{11} + 4t^{10} + t^9 + 4t^7 + t^4 + 3t^2 + 3t$$

Here, the first two conditions of the conditions of the above-described formula (23) are necessary conditions for satisfying the condition of the above-described formula (13). The probability (decryption failure probability) that the condition of the above-described formula (23) will not be satisfied even if the condition of the above-described formula (13) is satisfied will be described later in [Decryption failure probability].

3. Calculation of $m(u_x(t), u_y(t))$ $m(u_x(t), u_y(t))$ is calculated by the following formula (46).

$$m(u_x(t), u_y(t)) = c(u_x(t), u_y(t)) \bmod s(u_x(t), u_y(t)) \quad (46)$$

In this example, $m(u_x(t), u_y(t))$ is calculated as in the following formula (47).

$$m(u_x(t), u_y(t)) = 3t^{19} + 3t^{18} + t^{17} + t^{16} + 4t^{15} + \quad (47)$$

$$2t^{14} + t^{13} + 4t^{11} + 4t^{10} + 2t^9 + t^8 + t^7 + 4t^5 + 4t^4 + 2t^2 + 4t$$

4. Calculation of Plaintext Polynomial m(x, y)

Since the plaintext polynomial m(x, y) can be written as the following formula (48), the plaintext polynomial m(x, y) can be obtained by constructing and solving a linear equation having $m_{i, j, k}$ as a variable using the relationship of the following formula (49).

$$m(x, y) = \sum_{\substack{0 \le i+j \le 3 \\ 0 \le k \le d_m}} m_{i,j,k} \cdot x^i y^j t^k \quad (48)$$

$$m(u_x(t), u_y(t)) = \sum_{\substack{0 \le i+j \le 3 \\ 0 \le k \le d_m}} m_{i,j,k} \cdot x^i y^j t^k \quad (49)$$

Here, since the number of variables is $10(d_m+1)$ and the number of equations is $3d+d_m+1$, a solution exists when the number of equations is larger than the number of variables, that is, when $d \ge 3(d_m+1)$. This condition is the final condition of the conditions of the above-described formula (23). In this example, the plaintext polynomial m(x, y) is expressed by the following formula (50), and it can be confirmed that decryption is correctly performed.

$$m(x, y) = (3t+1)x^3 + (2t+2)x^2y + 3txy^2 + \quad (50)$$

$$(t4+1)y^3 + (t+1)x^2 + (2t+2)xy + 3ty^2 + 2tx + 2ty + 4t + 3$$

Decryption Failure Probability

The decryption failure probability of this scheme is evaluated. Even if the two polynomials $c(u_x(t), u_y(t))$ and $c(u_y(t), u_x(t))$ generated in step 1 of the above-described decryption algorithm satisfy the condition of the above-described formula (23), this scheme may fail to decrypt because the condition of the above-described formula (13) of the approximate GCD calculation is not satisfied. In order to see this, when the condition of the formula (23) is satisfied and the condition of the formula (13) is not satisfied, one of the conditions (A) and (B) of the following formula (51) is satisfied. The possibility that $$(A): \deg s(t) e'(t) < 2 \deg e(t)/e'(t) \qquad (51)$$
$$\text{or } (B): \deg e(t)/e'(t) \le \deg m(t)$$

Here, for the sake of simplicity,
$s(t) := s(u_x(t), u_y(t))$, $e'(t) := \mathrm{GCD}(e(u_x(t), u_y(t))\, e(u_y(t), u_x(t)))$, $e(t) := e(u_x(t), u_y(t))$, $m(t) := m(u_x(t), u_y(t))$ are written.

Among them, the condition (A) does not occur because the following formula (52) is established from the first condition of the conditions of the formula (23).

$$\deg s(t) e'(t) \ge \deg s(t) = 2d + d_e \ge 2(d + d_e) = 2\deg e(t) \ge 2\deg e(t)/e'(t) \qquad (52)$$

Therefore, it is sufficient to consider the probability of occurrence of the condition (B), and it is sufficient to calculate the probability of occurrence of an event of $\deg e'(t) \ge (d+d_e)-3d-d_m$. Here, assuming that the distribution of the coefficients of $e(u_x(t), u_y(t))$ and $e(u_y(t), u_x(t))$ is uniform, it is known that this probability is calculated as $p^{-N}(1-p^{-1})$ when $N = \deg e'(t)$. Therefore, the decryption failure probability K is evaluated by the following formula (53).

$$\kappa \le \sum_{N=(d+d_e)-3d-d_m}^{\infty} p^{-N}(1-p^{-1}) = p^{3d+d_m-(d+d_e)} \qquad (53)$$

Here, when a new parameter S is defined by the following formula (54), the decryption failure probability K can be written as the following formula (55), and it can be seen that the decryption failure probability decreases exponentially as the value of $\delta \le 0$ decreases.

$$\delta = 3d + d_m - (d + d_e) \qquad (54)$$
$$\kappa = p^{\delta} \qquad (55)$$

Parameter Determination Method

First, a method for determining the parameter indicated by [Parameter] described above will be described. Parameters that need to be determined in implementing and operating the encryption scheme of the present embodiment are p, d, $D_\xi$, and $d_\xi$. Here, t is five polynomials of X, m, s, e, and r. p, d, $D_\xi$, and $d_\xi$ are determined in the following order so as to satisfy the condition of the above-described formula (23).

1. Determination of p and $d_m$ p and $d_m$ are parameters related to the security of encryption, and p and $d_m$ are determined on the basis of the evaluation of the calculation amount required for the attack method described in [Examination of security] described later.

2. Setting of d d is set to $d = 3(d_m + 1)$ from the third condition of the formula (23) described above.

3. Setting of $d_x$

In the present embodiment, $d_x$ is set to $d_x = d - 1$. This is consistent with the setting in the key generation algorithm described above.

4. Setting, of Parameter S Related to Decryption Failure Probability

From the above-described formula (55), the parameter 6 is set to the following formula (56).

$$\delta = \lceil \kappa/|p| \rceil \qquad (56)$$

Here, the right side represents a minimum integer of $\kappa/|p|$ or more, and $|p|$ represents a bit length of p.

5. Setting of $d_e$ $d_e$ is set as in the following formula (57) from the second condition of the above-described formula (23) and the definition of $\delta$ of the above-described formula (54).

$$d_e = 3d + d_m - d + \delta \qquad (57)$$

6. Setting of $d_s$ $d_s$ is set as $d_s = 2d_e$ from the first condition of the formula (23) described above.

7. Setting of $d_r$ $d_r$ is set as $d_r = d_e + d_s - d_x$. With this setting, the condition of the following formula (58) is satisfied, and resistance to a linear algebraic attack described in [Linear algebraic attack] to be described later is generated.

$$\Delta_m \subset \Delta_{X_r} = \Delta_{se} \qquad (58)$$

As described above, it is possible to generate a parameter that satisfies the condition of the above-described formula (23) and the formula (58).

Security Assumption

A security assumption that is the basis of security of the method of the present embodiment is defined. Prior to this, the set $\Delta_{n,\,d}$ is defined by the following formula (59).

$$\Delta_{n,d} = \{(i, j, k) \in \mathbb{N}^3 | 0 \le i + j \le n, 0 \le k \le d\} \qquad (59)$$

That the polynomial $\xi(x, y)$ has a set $\Delta_{n,\,d}$ as a base means that it has a monomial $x^i y_j t^k$ corresponding to each element (i, j, k) of $\Delta_{n,\,d}$. A set of polynomials is defined by the following formula (60).

$$\mathcal{F}(\Delta_{n,d}) = \{\text{Polynomial having set } \Delta_{n,d} \text{ as base}\} \qquad (60)$$

In addition, $\Delta_x$ and $\Delta_s$ are defined as in the following formula (61).

$$\Delta_X = \{(i, j, k) \in \mathbb{N}^3 \mid 0 \le i + j \le 2, 0 \le k \le d_{X,v}, v = i + j\} \qquad (61)$$
$$\Delta_s = \{(i, j, k) \in \mathbb{N}^3 \mid 0 \le i + j \le 2, 0 \le k \le d_{s,v}, v = i + j\}$$

At this time, a polynomial set such as the following formula (62) using the set $\Delta_x$ as a base is considered.

$$\mathfrak{X}(\Delta_{x,d}) = \{X \in \mathcal{F}(\Delta_X) \mid \exists u_x(t), u_y(t) \in \mathbb{F}_p[t] \quad (62)$$
$$\text{s.t. } deg u_x(t) = deg u_y(t) = d, X(u_x(t), u_y(t)) = 0\}$$

This is a polynomial set in which $\Delta_x$ having a zero-point of the degree d defined above as $F_p[t]$ is a base. Here, a set of symmetric polynomials having the set $\Delta$ as a base is expressed by the following formula (63).

$$\bar{\mathcal{F}}(\Delta) = \{\text{Symmetric polynomial having } set\Delta \text{ as base}\} \quad (63)$$

The following calculation problem is defined for a set of the following formula (64) satisfying the condition of the formula (23).

$$\mathcal{F}(\Delta) = \{\text{Polynomial satisfying condition of formula (23)}\}$$

Definition 2 (approximate ideal decomposition problem) c is a sample from a polynomial set of the following formula (65).

$$\{se+Xr+m \mid s \in \bar{\mathcal{F}}(\Delta_s), r \in \mathcal{F}(\Delta_{D_r,d_r}), e \in \mathcal{F}(\Delta_{D_e,d_e}), m \in \mathcal{F}(\Delta_{D_m,d_m}), X \text{ is sample of polynomial } set\ x(\Delta_X, d)\} \quad (65)$$

The approximate ideal decomposition problem is a problem of obtaining s and e from a trivariable polynomial c=se+Xr+m and X given as the sample.

Further, an approximate ideal decomposition assumption is defined as follows.

The definition 3 (approximate ideal decomposition assumption) Approximate ideal decomposition assumption means that a probability of the following formula (66) is negligible for an arbitrary polynomial time algorithm A.

$$Adv_{\mathcal{A}}^{AI-FCT}(k) := Pr\left[V = (s, e) \middle| \begin{array}{l} (p, d, \Delta_X, \Delta_s, D_m, D_r, D_e, \\ d_m, d_r, d_e) \leftarrow Gen(1^k); \\ X \xleftarrow{U} X(\Delta_X, d); s \xleftarrow{U} \bar{\mathcal{F}}(\Delta_s); \\ m \xleftarrow{U} \mathcal{F}(\Delta_{D_m,d_m}); \\ r \xleftarrow{U} \mathcal{F}(\Delta_{D_r,d_r}); e \xleftarrow{U} \mathcal{F}(\Delta_{D_e,d_e}); \\ c := se + Xr + m; \\ V \leftarrow \mathcal{A}(p, d, \Delta_X, \Delta_s, D_m, D_r, \\ D_e, d_m, d_r, d_e, c) \end{array}\right] \quad (66)$$

Type equation here.

That is, it means that the following formula (67) holds.

$$Adv_{\mathcal{A}}^{AI-FCT}(k) < \epsilon(k) \quad (67)$$

Here, k is a security parameter, and $\epsilon(k)$ is a function representing a negligible magnitude. The function $\epsilon(k)$ usually uses $\epsilon(k)=2^{-k}$. In addition, the following theorem is established from the configuration of encryption.

Theorem 1 Under the approximate ideal decomposition assumption, the indeterminate equation cryptography $\Sigma$=(Gen, Enc, Dec) is secure in the sense of OW-CPA. That is, when there is an adversary who breaks the indeterminate equation cryptography in the sense of OW-CPA in polynomial time, there is an algorithm A that solves the approximate ideal decomposition problem in probabilistic polynomial time, and the following formula (68) holds.

$$Adv_{\Sigma,\mathcal{B}}^{OW-CPA}(k) \leq Adv_{\mathcal{A}}^{AI-FCT}(k) \quad (68)$$

Proof: c(x, y) is an arbitrary sample of the approximate ideal decomposition problem. It is assumed that there is an adversary who breaks the indeterminate equation cryptography E in terms of OW-CPA in polynomial time. At this time, a plaintext polynomial m(x, y) is obtained using the adversary, and the following formula (69) can be calculated.

$$c(x, y) - m(x, y) = s(x, y)e(x, y) + X(x, y)r(x, y) \quad (69)$$

Furthermore, these termination formulas are calculated as the following formula (70).

$$Res_x(c(x, y) - m(x, y), X(x, y)) \quad (70)$$
$$Res_y(c(x, y) - m(x, y), X(x, y))$$

s(x, y) and e(x, y) can be calculated by utilizing Algorithm 2 (ideal decomposition) in FIG. 2 described above. That is, this adversary can solve the approximate ideal decomposition problem, and the following formula (71) holds.

$$Adv_{\Sigma,\mathcal{B}}^{OW-CPA}(k) \leq Adv_{\mathcal{A}}^{AI-FCT}(k) \quad (71)$$

Some variations (modifications) of the present embodiment will be described below.

Variations of Ciphertext

Although the ciphertext in the present embodiment is defined by the above-described formula (41), the encryption method and the decryption method of the embodiment are similarly established even if the ciphertext is represented by the following formula (72), and the security described in [Examination of security] to be described later is also satisfied.

$$c(x, y) = s(x, y)e(x, y) \pm X(x, y)r(x, y) \pm m(x, y) \quad (72)$$

Variations Related to Compression of Public Key X(x, y)

In the above-described embodiment, coefficients of the indeterminate equation X(x, y) which is a public key are taken uniformly at random other than constant terms, and only some of the terms (in the above-described embodiment, xy terms) are adjusted. Although the information of the private key is required for the adjustment, the term that is not adjusted remains random. Therefore, if the seed used for the generation is disclosed, a specific pseudo random number generation function, a hash function, or the like can be designated and generated. Therefore, only coefficients of the seed and the adjusted part can be disclosed, and the size of the public key is compressed. In this way, in the above-described embodiment, the public key size can be compressed by disclosing the actual coefficient only in a part of the following formula (73), and disclosing the seed (usually having a bit length of only the security parameter) in other terms.

$$X = (3t^5 + 2t^4 + t^3 + t^2 + 3t + 4)xy + 2t^{11} + \quad (73)$$
$$4t^{10} + 3t^9 + 4t^8 + t^7 + 2t^6 + t^5 + 2t^4 + 2t^3 + t^2 + 3t + 4$$

This variation makes it possible to expand utilization to low-end devices having a small memory capacity.

Variation Regarding Coefficient of Public Key X(x, y)

In the above-described embodiment, coefficients of the indeterminate equation X(x, y) which is a public key are taken uniformly at random other than constant terms, and only some of the terms (in the above-described embodiment, xy terms) are adjusted. Here, each coefficient is an element of $F_p[t]$, and all the coefficients are not necessarily non-zero. If there is a non-zero coefficient, there is a possibility that the coefficients of some terms are always zero in X(x, y)r(x, y) of the ciphertext. In that case, in a linear algebraic attack or a coefficient comparison attack, there is a possibility that some information of the random polynomial constituting the ciphertext leaks (even if not all the information leaks) and a part of the information of the plaintext leaks therefrom. Therefore, in this variation, a method of making the coefficient of the coefficient $\tau_{ij}(t)$ of each term of the public key X(x, y) non-zero will be described.

In order to realize this, first, a range of random values when the coefficient $\tau_{ij}(t)$ is selected uniformly at random is set to 1 to p. As for the coefficients to be further adjusted, when some of the coefficients become zero as a result of the adjustment, the private key $u_x(t)$, $u_y(t)$ can be rearranged, or the seed used at the time of uniform random selection can be changed and rearranged to be non-zero.

Variations Regarding how to Take Term Set

In the above-described embodiment, the term sets are limited to the maximum term set for the sake of simplicity. This is sufficient to effectively hide the plaintext by the polynomial having unknown coefficients, but it is not necessary since it is required that the term s(x, y)e(x, y) and the term X(x, y)r(x, y) in the ciphertext c(x, y) have the same formula form. Therefore, in order to specify the form of these expressions, $\Delta_\xi$ can be determined instead of the parameters $D_\xi$ and $d_\xi$ (here, s, r, e, and X are included in ξ). With this setting, it is possible to realize with a term set smaller than the maximum term set, so that the sizes of the public key, the ciphertext, and the like can be suppressed.

Variations of Embedding Plaintext Information Also in s, r, and e

Although s, r, and e are not restored in the decryption algorithm, s, r, and e can be restored after obtaining the plaintext polynomial m. That is, when m(x, y) is obtained, the above-described formula (69) can be calculated, and s(x, y) and e(x, y) can be restored by applying the ideal decomposition described in [Ideal decomposition of multivariable polynomial] to the right side of the formula (69). r(x, y) can also be restored by calculating the following formula (74) from the restored s(x, y) and e(x, y).

$$(c(x, y) - m(x, y) - s(x, y)e(x, y))/X(x, y) \quad (74)$$

By doing so, the plaintext information or a part of the plaintext information can be embedded in s, r, and e. As a result, not only the bit length that can be encrypted at a time can be increased, but also the information as the authenticator can be added to realize the encryption scheme having resistance against the attack of falsifying the ciphertext. Note that, including the case of embedding in a plaintext polynomial, when embedding a plaintext, it is also possible to determine an embedding region in advance. In this case, by embedding a random value or information that is not affected even if decryption is performed in a portion that is not embedded, consistency as ciphertext can be maintained. Furthermore, even in a situation where some information leaks due to vulnerability caused by implementation such as a side-channel attack, it is possible to cope with a situation where information leakage may occur by not filling a plaintext.

Variation of Changing Degree of Approximate GCD in Approximate GCD Calculation

In the approximate GCD calculation described in [Approximate GCD calculation in univariable polynomial] of the above-described embodiment, it is necessary to designate the degree of s(u)e'(t) to be the approximate GCD. The degree is searched from degs(u) which is the minimum value of the degree of s(u)e'(t). The degree degs(u)e'(t) of the approximate GCD serving as an input for the approximate GCD calculation is $D_s d + d_s$ or more in many cases, but may be smaller than $D_s d + d_s$.

In this variation, an embodiment considering a case where $D_s d + d_s$ is smaller than $D_s d + d_s$ will be described. In order to implement this variation, the step of approximate GCD calculation in the decryption algorithm is executed by setting the degree D from a value smaller than $D_s d + d_s$. Then, in a case where the plaintext is not restored, D in FIG. 1 is gradually increased and finally increased to a value exceeding $D_s d + d_s$, and the processing is executed. In this way, it is possible to decrypt the ciphertext that has failed to be decrypted when the degree of the approximate GCD is less than degs(u).

Variations Related to Variable

In the above-described embodiment, the bivariable polynomial on $F_p[t]$ has been consistently described, but an encryption algorithm, a decryption algorithm, and a key generation algorithm are established with general n variables similarly to the present embodiment. Even if the number of variables is larger than three, if there is one indeterminate equation $X(x_1, \ldots, x_n)$, it is still an indeterminate equation, and the solving problem is computational hard. On the contrary, an increase in the number of variables often makes the problem more computational hard, and enhances the security. Therefore, not only the key size can be reduced, but also the size of the plaintext that can be embedded increases since there are many variables. On the other hand, since the coefficient to be restored increases, the system parameter needs to be changed to $d_s = n(d_m + 1)$. Note that, in a case where the number of variables is three or more, the present embodiment is established as long as at least two of the variables are symmetric.

Variation of Changing Degree of Coefficient $m_{ij}(t)$ of Plaintext Polynomial for Each Term In the above-described embodiment, the degree of the coefficient $m_{ij}(t)$ of the plaintext polynomial has been uniformly simplified to $d_m$. In the processing of restoring m(x, y), processing of creating linear simultaneous equations in step 4 of the decryption algorithm illustrated in [Decryption algorithm] described above from $m(u_x(t), u_y(t))$ and solving the linear simultaneous equations is performed. At this time, in order to derive a unique solution, the number of equations needs to be equal to or larger than the number of variables.

The number of equations matches the degree of a univariable polynomial $m(u_x(t), u_y(t))$.

On the other hand, the number of high-degree terms (terms with higher degree) of $m(x, y)$ is larger than the number of low-degree terms such as $x^3$, $x^2y$, $xy^2$, $y^3$ when $D_m=3$. Therefore, regarding the degree of the coefficient at $m(x, y)$, the number of formulas can be increased while suppressing the number of variables by lowering the degree of the coefficient of the high-degree term and increasing the degree of the coefficient of the low-degree term. Furthermore, with such a configuration, there is also an advantage that the decryption condition of the above-described formula (23) can be relaxed as compared with the case where $D_e$ is uniformly determined.

Some or all of the above-described variations can be used in combination.

Specific Configuration

Next, specific configurations and operation methods of the encryption device, the decryption device, and the key generation device in the public-key cryptography of the present embodiment will be described.

Figure 4:
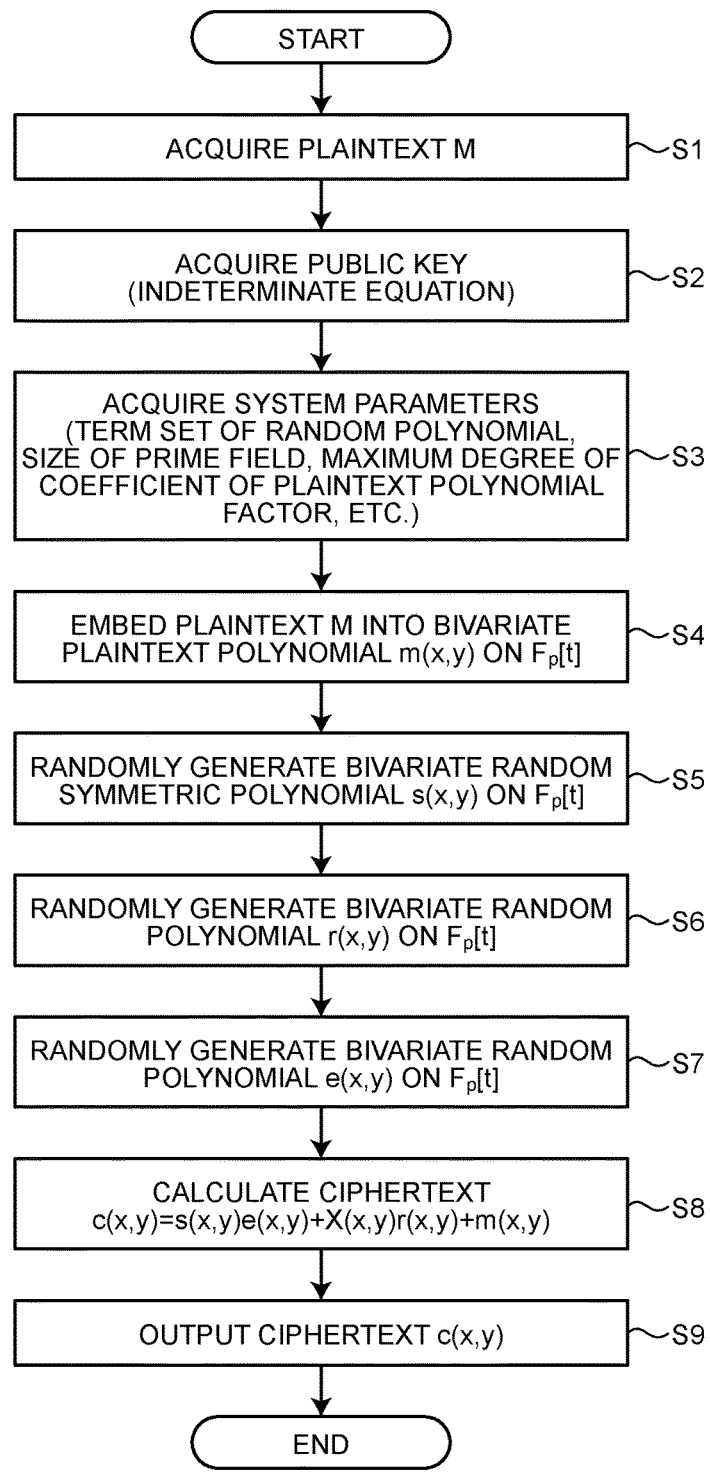
FIG. 4 is a flowchart illustrating an example of an encryption method according to an embodiment.

First, the configuration of the encryption device according to the present exemplary embodiment and the flow of processing are illustrated along the flowchart illustrated in FIG. 4 with reference to the overall configuration diagram illustrated in FIG. 3.

AN encryption device 10 according to the embodiment, includes a plaintext acquisition module 1, a public-key acquisition module 2, a plaintext embedding module 3, a storage unit 4, an encryption module 5, a polynomial generation module 6, a random value generation module 7, a polynomial operation module 8, and a ciphertext output module 9.

First, the plaintext acquisition module 1 acquires a plaintext M (Step S1). The plaintext acquisition module 1 acquires, for example, encryption target data acquired from another application, another device, or the like as a plaintext M. The plaintext acquisition module 1 inputs the plaintext M acquired in Step S1 to the plaintext embedding module 3.

Next, the public-key acquisition module 2 acquires a bivariable symmetric indeterminate equation $X(x, y)$ as a public key (Step S2). The public-key acquisition module 2 acquires a public key from another device such as a key generation device described later, for example. The public-key acquisition module 2 inputs the public key acquired in Step S2 to the encryption module 5.

Next, the plaintext embedding module 3 acquires the system parameters p, $D_m$, and $d_m$ from the storage unit 4, and the encryption module 5 acquires the system parameters p, $D_s$, $D_r$, $D_e$, $d_s$, $d_r$, and $d_e$ conforming to the public key acquired in Step S2 from the storage unit 4 (Step S3).

Next, the plaintext embedding module 3 divides the plaintext M input from the plaintext acquisition module 1 into $10(d_m+1)$ subblocks of $|p|-1$ bits ($|p|$ is a bit length of p). The plaintext embedding module 3 embeds the plaintext M divided into each sub-block in the coefficients of the bivariable plaintext polynomial $m(x, y)$ on $F_p[t]$ of the above-described formula (48) (Step S4). Here, since the degree of each coefficient $m_{i,j}(t)$ is $d_m$ and the coefficients of these polynomials are the element of $F_p$, the block size of the encryption scheme of the present embodiment is $10(d_m+1)$ $|p|$. When a larger plaintext is input, the text is first divided into this block size and then encrypted for each block.

The plaintext embedding module 3 inputs the plaintext polynomial $m(x, y)$ generated in Step S4 to the encryption module 5.

Next, the encryption module 5 inputs the system parameters p, $D_s$, and $d_s$ to the polynomial generation module 6, and instructs the polynomial generation module 6 to generate two random symmetric polynomials $s(x, y)$ having a $d_s$-degree polynomial as a coefficient according to a maximum term set (hereinafter, simply a term set) rs formed from the system parameters p, $D_s$, and $d_s$. The polynomial generation module 6 instructs the random value generation module 7 to cause the random value generation module 7 to generate as many integers as necessary from 0 to p-1 as to be coefficients of the coefficient $s_{ij}(t)$, and generates $s(x, y)$ on the basis of these integers (Step S5). Here, since it is necessary to set $s_{ij}(t)=s_{ji}(t)$, if $D_s=2$, $4(d_s+1)$ random values from 0 to p-1 are generated.

Next, the encryption module 5 continuously inputs the system parameters p, $D_r$, and $d_r$ to the polynomial generation module 6, and generates a $D_r$-degree random polynomial $r(x, y)$ having a $d_r$-degree polynomial as a coefficient by the same method as the method of generating the random polynomial $s(x, y)$ (Step S6).

Next, the encryption module 5 continuously inputs the system parameters p, $D_e$, and $d_e$ to the polynomial generation module 6, and generates a $D_e$-degree random polynomial $e(x, y)$ having a $d_e$-degree polynomial as a coefficient by the same method as the method of generating the random polynomial $s(x, y)$ (Step S7).

Next, the encryption module 5 calculates (generates) the ciphertext $c(x, y)$ while causing the polynomial operation module 8 to calculate the polynomials $s(x, y)$, $r(x, y)$, and $e(x, y)$, the public key $X(x, y)$, and the plaintext polynomial factor $m(x, y)$ every time according to the above-described formula (41) (Step S8). The encryption module 5 inputs the ciphertext $c(x, y)$ to the ciphertext output module 9 (Step S9).

Finally, the ciphertext output module 9 outputs the ciphertext $c(x, y)$ as the output of the encryption device 10 (after being deformed according to a predetermined format if necessary) (Step S9). The predetermined format is, for example, a format of binary data defined as an input format of a subsequent device or the like to which the ciphertext is input.

Figure 5:
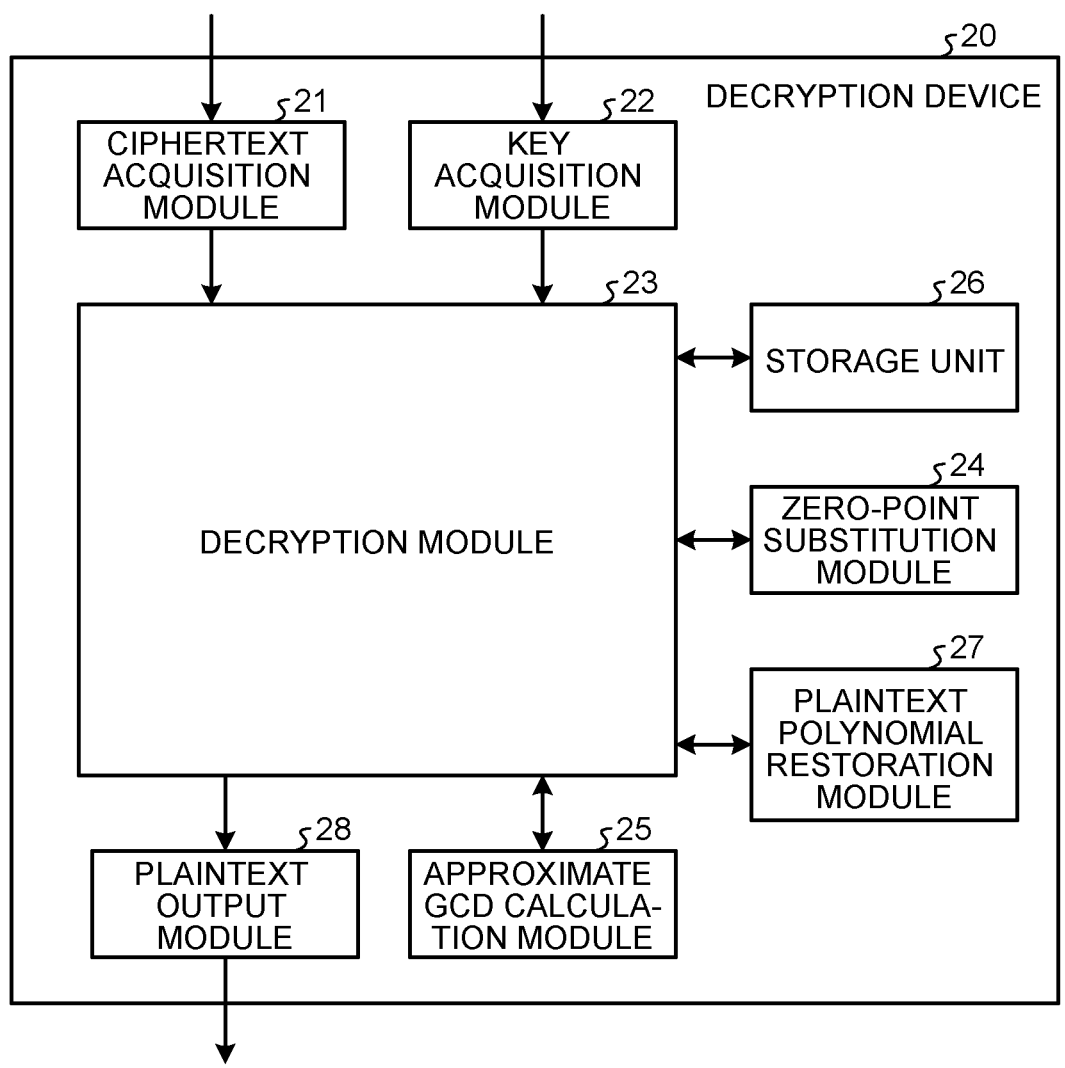
FIG. 5 is a diagram illustrating an example of a functional configuration of a decryption device according to the embodiment.
Figure 6:
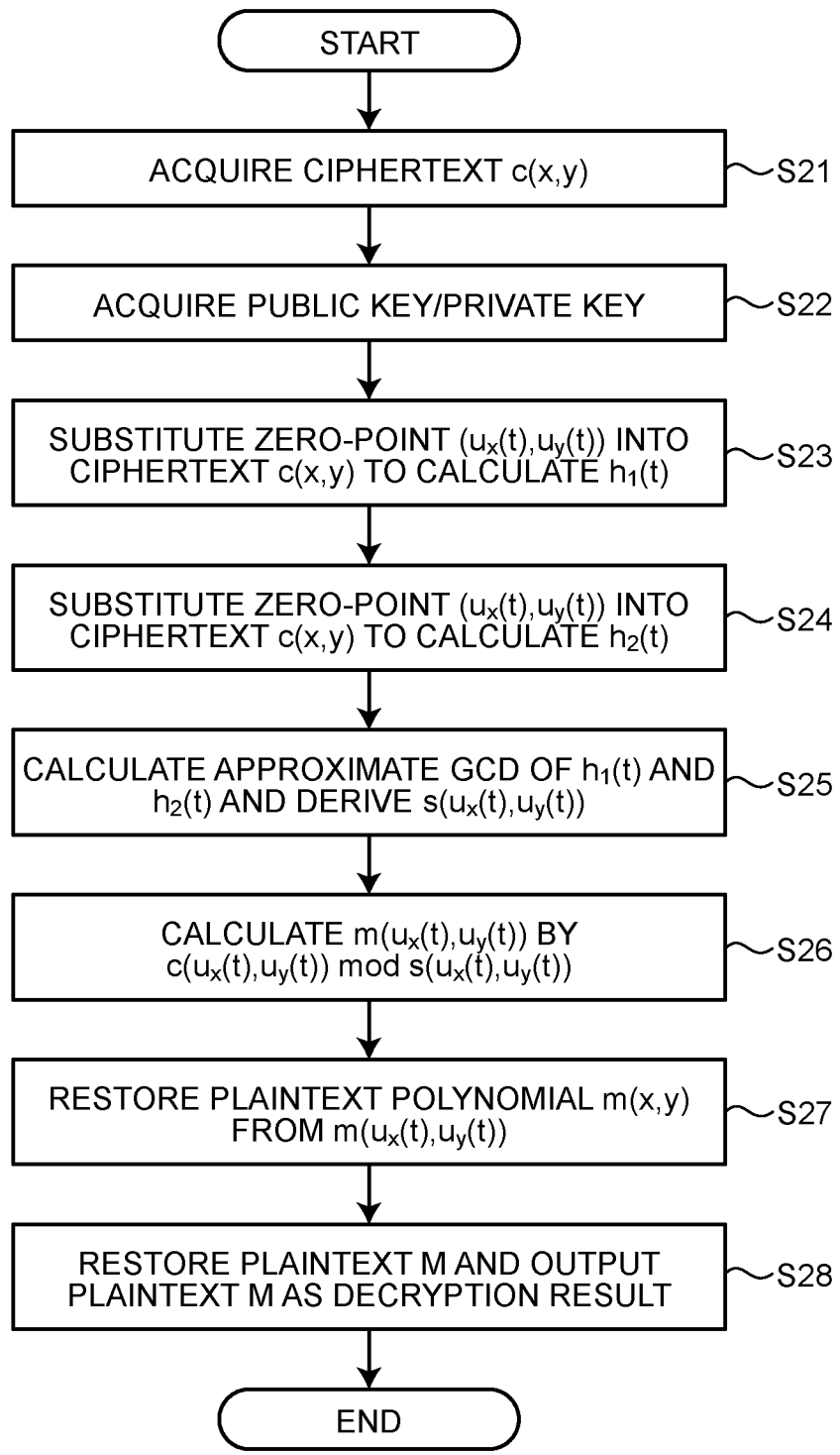
FIG. 6 is a flowchart illustrating an example of a decryption method according to an embodiment.

Next, a configuration and a processing flow of the decryption device according to the present exemplary embodiment will be described with reference to an overall configuration diagram illustrated in FIG. 5 along a flowchart illustrated in FIG. 6.

A decryption device 20 according to the embodiment includes a ciphertext acquisition module 21, a key acquisition module 22, a decryption module 23, a zero-point substitution module 24, an approximate GCD calculation module 25, a storage unit 26, a plaintext polynomial restoration module 27, and a plaintext output module 28.

First, the ciphertext acquisition module 21 acquires a ciphertext c (Step S21). The ciphertext acquisition module 21 acquires a ciphertext $c(x, y)$ from another device via, for example, a network.

Next, the key acquisition module 22 acquires a public key $(X(x, y))$ and a private key (zero-point u:$(u_x(t), u_y(t))$ (Step S22). The key acquisition module 22 acquires a public key $(X(x, y))$ from another device or the like via a network, for example, and acquires a private key (zero-point u:$u_x(t)$, $u_y(t)$) from the storage unit 26 or the like of the decryption device 20.

Next, when the decryption module 23 receives the ciphertext c from the ciphertext acquisition module 21 and receives the public key $(X(x, y))$ and the private key (zero-point $u:u_x(t), u_y(t)$) from the key acquisition module 22, the decryption processing is started.

The decryption module 23 first inputs the ciphertext $c(x, y)$ and the zero-point u to the zero-point substitution module 24. The zero-point substitution module 24 substitutes the zero-point u to $c(x, y)$ and calculates $h_1(t)$ (Step S23). The zero-point substitution module 24 inputs $h_1(t)$ to the decryption module 23.

Next, the zero-point substitution module 24 substitutes the zero-point u into $c(y, x)$ obtained by inverting x and y of the ciphertext, and calculates $h_2(t)$ (Step S24). The zero-point substitution module 24 inputs $h_2(t)$ to the decryption module 23.

Next, when receiving $h_k(t)$ (k=1, 2) from the zero-point substitution module 24, the decryption module 23 inputs $h_k(t)$ (k=1, 2) and the degree $D_s d + d_s$ of $s(u_x(t), u_y(t))$ to the approximate GCD calculating unit 25. The approximate GCD calculation module 25 calculates the approximate GCD of $h_k(t)$ (k=1, 2), and inputs the derived $s(u_X(t), u_y(t))e'(t)$ (where e' (t):=GCD($e(u_x(t), u_y(t))$, $e(u_y(t), u_x(t))$)) to the decryption module 23 (Step S25).

Next, upon receiving $s(u_x(t), u_y(t))e'$ (t) from the approximate GCD calculation module 25, the decryption module 23 calculates a remainder $m(u_x(t), u_y(t))$ by dividing $h_1(t)$, that is, $c(u_x(t), u_y(t))$ by $s(u_x(t), u_y(t))$ (Step S26).

Next, the plaintext polynomial restoration module 27 restores the plaintext polynomial $m(u_x(t), u_y(t))$ by the method described in [Decryption algorithm] above from $m(x, y)$ calculated in Step S26, the zero-point u, and the system parameter $d_m$ (Step S27). Here, in a case where the plaintext polynomial $m(x, y)$ cannot be restored, the plaintext polynomial restoration module 27 transmits an error to the decryption module 23 and ends the processing.

In a case where the plaintext polynomial $m(x, y)$ is restored, the plaintext output module 28 extracts the plaintext M from the coefficients of the plaintext polynomial $m(x, y)$, outputs the extracted plaintext M (Step S28), and ends the processing.

Figure 7:
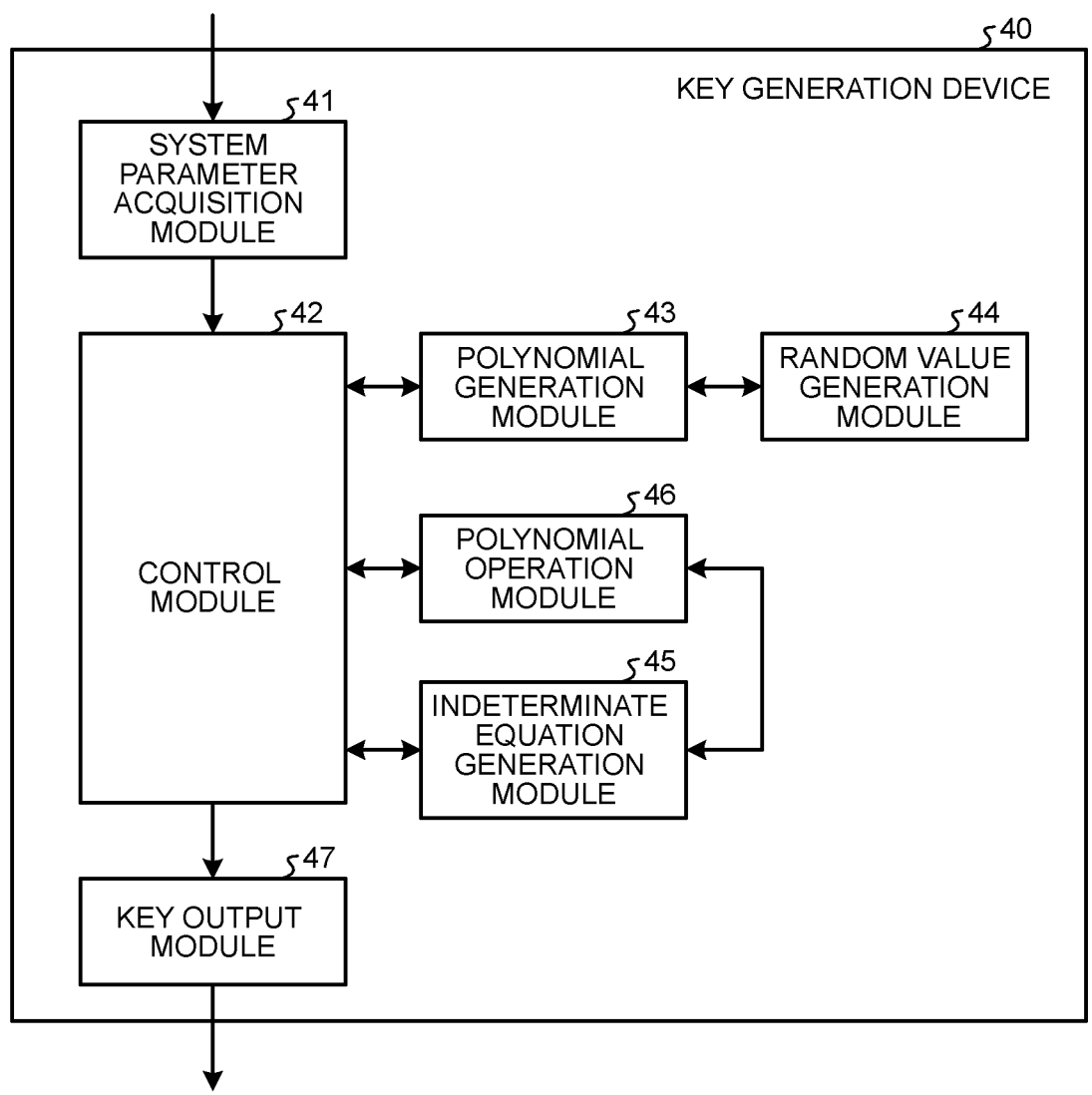
FIG. 7 is a diagram illustrating an example of a functional configuration of a key generation device according to an embodiment.
Figure 8:
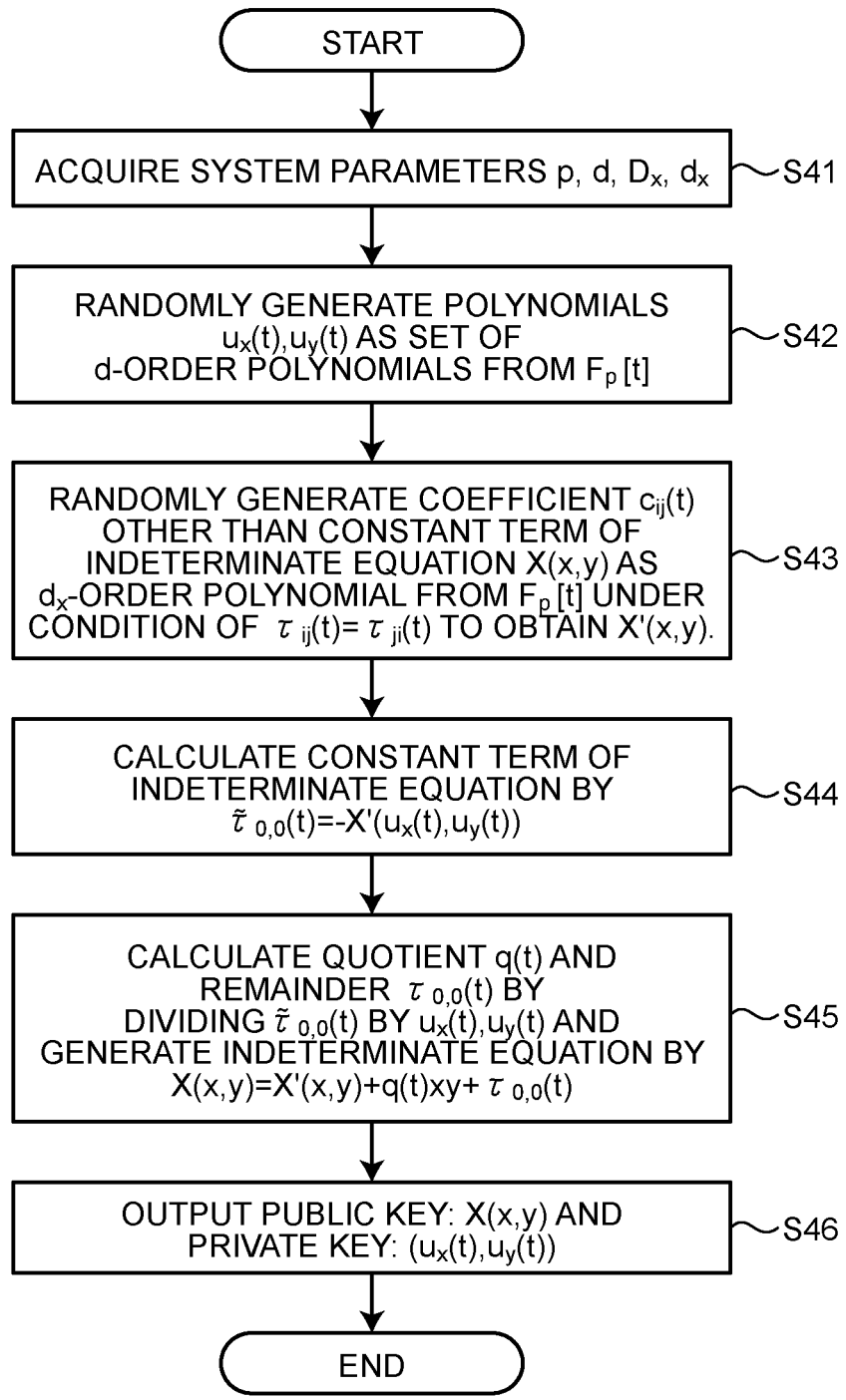
FIG. 8 is a flowchart illustrating an example of a key generation method according to the embodiment.

Next, the configuration of the key generation device according to the present exemplary embodiment and the flow of processing will be described along the flowchart illustrated in FIG. 8 with reference to the overall configuration diagram illustrated in FIG. 7.

A key generation device 40 according to the embodiment includes a system parameter acquisition module 41, a control module 42, a polynomial generation module 43, a random value generation module 44, an indeterminate equation generation module 45, a polynomial operation module 46, and a key output module 47.

First, the system parameter acquisition module 41 acquires the system parameters p, d, $D_x$, and $d_x$ (Step S41). The system parameters p, d, $D_x$, and $d_x$ are acquired, for example, by receiving an input from a user. In addition, for example, the system parameters p, d, $D_x$, and $d_x$ are acquired by reading setting data or the like including the system parameters p, d, $D_x$, and $d_x$.

The system parameter acquisition module 41 inputs the system parameters to the control module 42. The control module 42 performs the following processing in cooperation with other processing units on the basis of the system parameter input from the system parameter acquisition module 41.

First, the control module 42 inputs p and d among the system parameters input from the system parameter acquisition module 41 to the polynomial generation module 43, and instructs generation of two d-degree polynomials $u_x(t)$, $u_y(t)$ included in $F_p[t]$. Next, the polynomial generation module 43 instructs the random value generation module 44 to generate 2(d+1) integers from 0 to p-1. The random value generation module 44 generates 2(d+1) random numbers from 0 to p-1 by using a pseudo random number generation module or the like, and inputs the generated random numbers to the polynomial generation module 43. The polynomial generation module 43 generates polynomials $u_x(t), u_y(t)$ having 2(d+1) random numbers input from the random value generation module 44 as coefficients (Step S42), and inputs the polynomials $u_x(t), u_y(t)$ to the control module 42.

The control module 42 holds (stores) the polynomials $u_x(t), u_y(t)$ received from the polynomial generation module 43 as private keys.

Furthermore, the control module 42 generates a public key (a symmetric indeterminate equation $X(x, y)$ expressed by the following formula (75)).

$$X(x, y) = \sum_{(i,j) \in \Gamma_X} \tau_{ij}(t) x^i y^j \qquad (75)$$

In order to generate the public key, the control module 42 extracts a $d_x$-degree polynomial $\tau_{ij}(t)$ ($0 \leq i \leq j \leq D_x$) that is a coefficient $\tau_{ij}(t)$ other than a constant term of $X(x, y)$ from $F_p[t]$ and sets $\tau_{ji}(t) = \tau_{ij}(t)$.

Specifically, similarly to the case of generating the polynomials $u_x(t), u_y(t)$, the control module 42 inputs the parameters p and d to the polynomial generation module 43, and instructs generation of $\tau_{ij}(t)$ ($0 \leq i \leq j \leq D_x$) included in $F_p[t]$. The polynomial generation module 43 generates a polynomial $\tau_{ij}(t)$ using the random value generation module 44. The polynomial generation module 43 inputs the polynomial $\tau_{ij}(t)$ to the control module 42. The control module 42 sets $\tau_{ji}(t) = \tau_{ij}(t)$ in a case where i≠j.

The control module 42 inputs the polynomial $\tau_{ij}(t)$, the system parameters p, d, $D_x$, and $d_x$, and the private key $u_x(t)$, $u_y(t)$ generated by the polynomial generation module 43 to the indeterminate equation generation module 45.

The indeterminate equation generation module 45 first uses the polynomial operation module 46 to generate an indeterminate equation $X'(x, y)$ having no constant term (Step S43). Next, the indeterminate equation generation module 45 calculates a provisional constant term by the following formula (76) by substituting the private key (polynomial $u_x(t), u_y(t)$) into the variables x and y of $X'(x, y)$, respectively (Step S44).

$$\tilde{\tau}_{0,0}(t) = -X'(u_x(t), u_y(t)) \qquad (76)$$

Next, the indeterminate equation generation module 45 and the polynomial operation module 46 perform processing of reducing the degree of the provisional constant term of the above-described expression (76) to generate the indeterminate equation $X(x, y)$ (Step S45).

This degree reduction processing is processing of converting the temporary constant term and the private key $u_x(t), u_y(t)$ into another indeterminate equation having a constant term whose degree is $d_x(=d-1)$ or less among the indeterminate equations having the same zero-point.

A basic principle is to use a private key (zero-point) to replace with an indeterminate equation with low-degree constant terms having the same zero-point. Since the theoretical background is as described above, only a procedure is illustrated here.

For the sake of simplicity, it is assumed that X(x, y) includes an xy term in the following description. First, the control module 42 instructs the polynomial operation module 46 to calculate the following formula (77) and replaces this value with $\hat{\tau}_{0,0}(t)$, and instructs the polynomial operation module 46 to calculate the following formula (78) to obtain a polynomial q(t).

$$\hat{\tau}_{0,0}(t) \bmod u_x(t) u_y(t) \qquad (77)$$

$$q(t) = \hat{\tau}_{0,0}(t)/u_x(t)u_y(t) \qquad (78)$$

Here, q(t) is a quotient obtained by dividing the provisional constant term of the above-described formula (76) by $u_x(t)u_y(t)$, and the degree is $d_x$ (=d-1). The degree of $\tau_{0,0}(t)$ is $d_x+d_x$(=2d-1).

Finally, the control module 42 causes the indeterminate equation generation module 45 to calculate X(x, y)=X'(x, y)+q(t)xy+$\tau_{0,0}(t)$, and sets this output as the indeterminate equation X(x, y) of the public key. The indeterminate equation generation module 45 inputs the indeterminate equation X(x, y) generated in this way to the control module 42.

The control module 42 confirms that the series of processes described above is completed, and inputs the public key X(x, y) and the private key $u_x(t)$, $u_y(t)$ generated in Step S45 to the key output module 47. The key output module 47 outputs the public key (X(x, y) and the private key ($u_x(t)$, $u_y(t)$)) input from the control module 42 to the outside of the key generation device 40 (Step S46).

Specific Configuration Related to Variations Described Above

Next, a specific configuration related to the above-described variation (modification) will be described.

The variation of the ciphertext can be realized by calculating the variation by the above-described formula (72) in the step of creating the ciphertext in the encryption module 5 of the encryption device 10 and performing an obvious modification in consideration of this in the decryption device 20.

A variation related to the public key compression can be realized by adding a random number seed to an input to the random value generation module 44 in the key generation device 40, or adding a random number seed used for generation in the random value generation module 44 to an output from the random value generation module 44, and finally changing the input to the public key X(x, y) from the key output module 47 and outputting the adjusted coefficient and the random number seed. Note that, in the encryption device 10 and the decryption device 20, when the public key is input, the original public key X(x, y) can be restored by restoring a coefficient that is not adjusted using the random number seed and adding an adjusted coefficient included in the public key. At this time, the decryption device 20 needs to include a polynomial generation module similar to the polynomial generation module 6 of the encryption device 10 and a random value generation module including the same pseudo-random function as the random value generation module 44 of the key generation device 40.

Regarding the variation related to the public key coefficient, when the random value generation module 44 in the key generation device 40 generates the coefficient of the coefficient $\tau_{ij}(t)$ of the public key X(x, y), the range of random numbers is set to 1 to p-1. In the step of adjusting the coefficients (step of reducing the degree of the constant term $\tau_{0,0}(t)$ of the indeterminate equation by the zero-point $(u_x(t), u_y(t))$), in a case where the adjusted coefficients $\tau_{1,1}(t)$ and $\tau_{0,0}(t)$ include non-zero coefficients, the adjustment is realized again by starting again from the portion of randomly generating coefficients other than the constant term of the indeterminate equation X(x, y).

Variations regarding how to obtain the term set are realized by changing the system parameters $D_\xi$ and $d_\xi$ to the designated term set $\Delta_\xi$ in each of the key generation device 40 and the encryption device 10 and generating a public key, a random polynomial, and a noise polynomial on the basis of $\Delta_\xi$. Here, $\xi$ is X, s, r, or e.

As for variations in embedding the plaintext information also in s(x, y), r(x, y), and e(x, y), the encryption device 10 does not randomly generate s(x, y), r(x, y), and e(x, y), but embeds (a part of) the plaintext in a manner similar to embedding of the plaintext in the polynomial.

Figure 9:
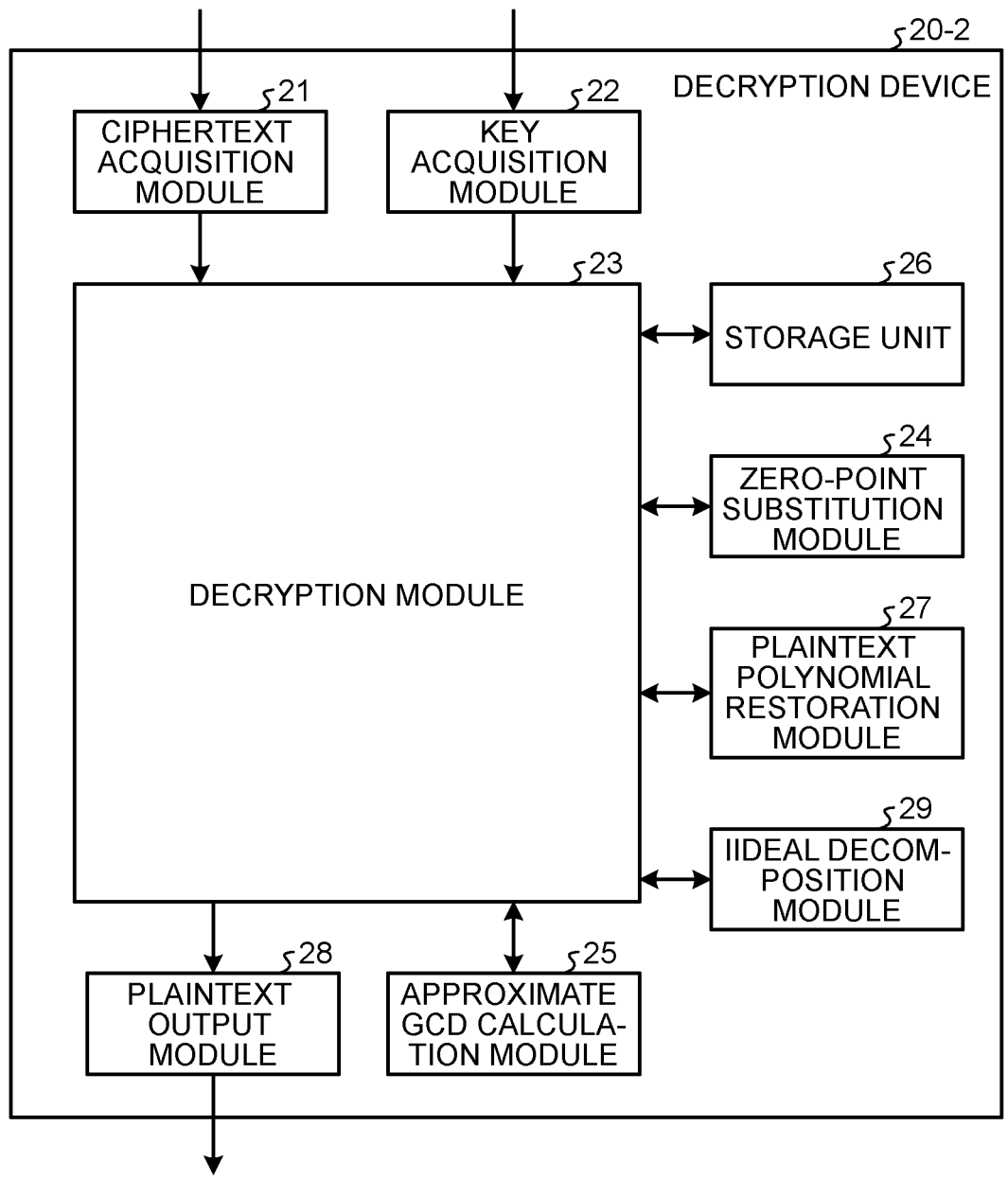
FIG. 9 is a diagram illustrating an example of a functional configuration of a decryption device according to a modification of the embodiment.
Figure 10:
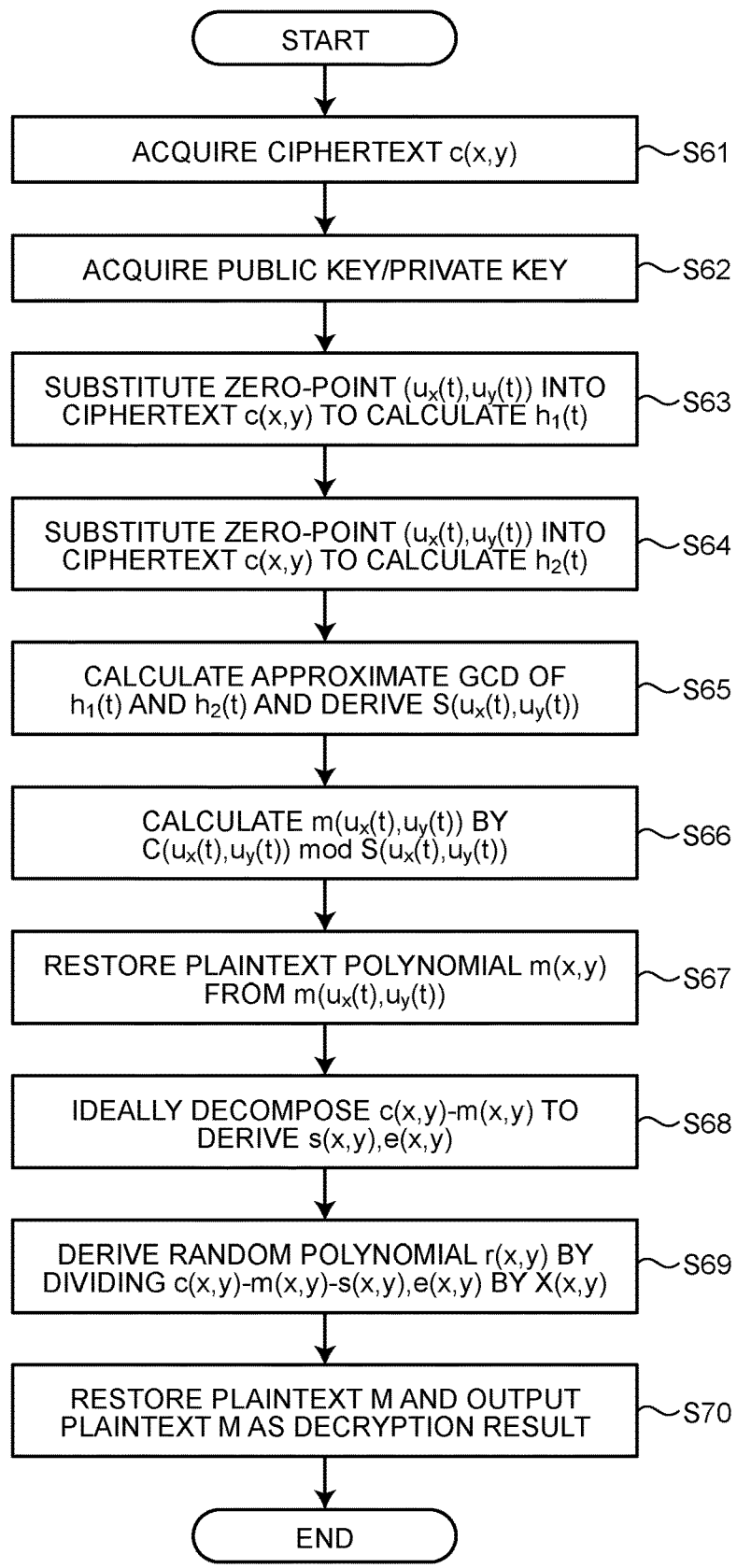
FIG. 10 is a flowchart illustrating an example of a decryption method according to a modification of the embodiment.

Furthermore, in the decryption device of this variation, the configuration and the flow of processing will be described along the flowchart illustrated in FIG. 10 with reference to the overall configuration diagram illustrated in FIG. 9.

A decryption device 20-2 of this variation includes a ciphertext acquisition module 21, a key acquisition module 22, a decryption module 23, a zero-point substitution module 24, an approximate GCD calculation module 25, a storage unit 26, a plaintext polynomial restoration module 27, a plaintext output module 28, and an ideal decomposition module 29. That is, in the decryption device 20-2 of this variation, the ideal decomposition module 29 is added.

In the decryption device 20-2 of this variation, the processing starts with acquiring the ciphertext c(x, y) from the ciphertext acquisition module 21 and acquiring the public key X(x, y) and the private key (zero-point u:$u_x(t)$, $u_y(t)$) from the key acquisition module 22, and the processing (Steps S61 to S67) up to restoring the plaintext polynomial m(x, y) from m($u_x(t)$, $u_y(t)$) is the same as the processing (Steps S21 to S27) of the decryption module 23 of the above-described embodiment. Therefore, here, subsequent processing will be described.

When the plaintext polynomial m(x, y) is successfully restored by the plaintext polynomial restoration module 27, the plaintext polynomial m(x, y) is input to the decryption module 23, and when the restoration fails, an error is input to the decryption module 23. When receiving an error from the plaintext polynomial restoration module 27, the decryption module 23 outputs an error to the plaintext output module 28 and ends the processing.

When receiving the plaintext polynomial m(x, y) from the plaintext polynomial restoration module 27, the decryption module 23 calculates c(x, y)−m(x, y) and inputs c(x, y)−m(x, y) to the ideal decomposition module 29. The ideal decomposition module 29 derives s(x, y) and e(x, y) by ideally decomposing c(x, y)−m(x, y) based on Algorithm 2 (FIG. 2) (Step S68). The ideal decomposition module 29 inputs s(x, y) and e(x, y) to the decryption module 23.

Next, the decryption module derives r(x, y) by calculating the formula (74) described above by combining s(x, y), e(x, y) and m(x, y) (Step S69).

In each of the above-described steps, when the polynomial cannot be restored, the decryption module 23 notifies the plaintext output module 28 of a decryption error, and the plaintext output module 28 outputs the decryption error and an empty decryption result. In a case where all of m(x, y), s(x, y), e(x, y), and r(x, y) have been restored, the decryption module 23 extracts a plaintext divided from the coefficients of the decrypted plaintext polynomial, and restores the plaintext M from the divided plaintext. The plaintext output module 28 outputs the restored plaintext M (Step S70).

Regarding variations of changing the degree of the approximate GCD in the approximate GCD calculation, an appropriate natural number m may be determined, and the part,
for D=degs(t) to degs(t)+n do, in Algorithm 1 (FIG. 1) may be changed as follows:
for D=degs(t)−m to degs(t)+n do.

Variations related to the variables can be realized by changing the variables from x, y to $x_1, \ldots, x_n$ in the encryption algorithm, the decryption algorithm, and the key generation algorithm of the above-described embodiments, and making the polynomial X, s a symmetric expression related to at least two of these variables $x_1, \ldots, x_n$.

Note that the private key of the key generation device 40 is $(u_{x1}(t), \ldots, u_{xn}(t))$. In addition, in the decryption device 20, in the processing of substituting the private key u into the ciphertext, only the symmetric portion of the ciphertext $c(x_1, \ldots, x_n)$ is substituted into the inverted polynomial, so that the decryption device can be obviously configured.

For example, in the encryption device 10 of this variation, the public-key acquisition module 2 acquires, as a public key, an n-variable symmetric indeterminate equation $X(x_1, \ldots, x_n)$ having, as a coefficient, an element of less than or equal to a constant degree of a univariable polynomial ring $F_p[t]$ on a finite field $F_p$, and being symmetric with respect to at least two variables. The plaintext embedding module 3 embeds the plaintext M into coefficients of an n-variable plaintext polynomial $m(x_1, \ldots, x_n)$ having an element of less than or equal to a constant degree of a univariable polynomial ring $F_p[t]$ as coefficients. The polynomial generation module 6 randomly generates an n-variable polynomial $r(x_1, \ldots, x_n)$ having, as a coefficient, an element of less than or equal to a constant degree a univariable polynomial ring $F_p[t]$, randomly generates an n-variable symmetric polynomial $s(x_1, \ldots, x_n)$, as a coefficient, an element of less than or equal to a constant degree of a univariable polynomial ring $F_p[t]$ and being symmetric with respect to at least two variables, and randomly generates a noise polynomial $e(x_1, \ldots, x_n)$ having, as a coefficient, an element of less than or equal to a constant degree of a univariable polynomial ring $F_p[t]$. Then, the encryption module 5 generates a ciphertext $c(x_1, \ldots, x_n)$ by encryption processing of performing an operation including at least one of addition, subtraction, and multiplication of an n-variable polynomial $r(x_1, \ldots, x_n)$, an n-variable symmetric polynomial $s(x_1, \ldots, x_n)$, a noise polynomial $e(x_1, \ldots, x_n)$, and an n-variable symmetric indeterminate equation $X(x_1, \ldots, x_n)$ on the n-variable plaintext polynomial $m(x_1, \ldots, x_n)$.

Furthermore, for example, in the decryption device 20 of this variation, the key acquisition module 22 acquires, as the private key, one or more zero-points u of the n-variable symmetric indeterminate equation $X(x_1, \ldots, x_i, \ldots, x_j, \ldots, x_n)$ having an element of less than or equal to a constant degree of the univariable polynomial ring $F_p[t]$ on the finite field $F_p$ as a coefficient and being symmetric with respect to at least two variables $x_i$ and $x_j$ ($1 \le i \le j \le n$). The zero-point substitution module 24 substitutes the zero-point u into the ciphertext $c(x_1, \ldots, x_i, \ldots, x_j, \ldots, x_n)$ to generate a univariable polynomial $h_1(t)$, and substitutes the zero-point u into the ciphertext $c(x_1, \ldots, x_j, \ldots, x_i, \ldots, x_n)$ obtained by inverting the variable $x_i$ and the variable $x_j$ of the ciphertext $c(x_1, \ldots, x_i, \ldots, x_j, \ldots, x_n)$ to generate a univariable polynomial $h_2(t)$. The approximate GCD calculation module 25 calculates the approximate GCD of the univariable polynomial $h_k(t)$ (k=1, 2) to obtain a univariable polynomial m(u) obtained by substituting the zero-point u into the n-variable plaintext polynomial $m(x_1, \ldots, x_n)$. The plaintext polynomial restoration module 27 obtains a plaintext polynomial $m(x_1, \ldots, x_n)$ by solving simultaneous linear equations derived from a univariable polynomial m(u) and one or more zero-points u. Then, the decryption module 23 decrypts the plaintext M from the coefficients of the plaintext polynomial $m(x_1, \ldots, x_n)$.

Furthermore, for example, in the key generation device 40 of this variation, the system parameter acquisition module 41 generates, as a public key, the n-variable symmetric indeterminate equation $X(x_1, \ldots, x_n)$ having, as a coefficient, an element of less than or equal to a constant degree of the univariable polynomial ring $F_p[t]$ on the finite field $F_p$, and being symmetric with respect to at least two variables, and acquires the prime number p, the degree d, the total degree $D_x$ regarding the variables $x_1, \ldots, x_n$, and the degree $d_x$ used when one or more zero-points u of the n-variable symmetric indeterminate equation $X(x_1, \ldots, x_n)$ are generated as a private key. The polynomial generation module 43 has n(d+1) random numbers from 0 to p−1 randomly generated as coefficients, generates n d-degree polynomials $u_xi(t), \ldots, u_{xn}(t)$ included in the univariable polynomial ring $F_p[t]$, and generates a $d_x$-degree polynomial $\tau_{ij}(t)$ ($0 \le i \le j \le D_x$, $\tau_{ij}(t)=\tau_{ji}(t)$) that is a coefficient other than a constant term of the n-variable symmetric indeterminate equation $X(x_1, \ldots, x_n)$. The indeterminate equation generation module 45 calculates a provisional constant term of the n-variable symmetric indeterminate equation $X(x_1, \ldots, x_n)$ from the n polynomials $u_{x1}(t), \ldots, u_{xn}(t)$ and the polynomial $\tau_{ij}(t)$ ($0 \le i \le j \le D_x$, $\tau_{ji}(t)=\tau_{ij}(t)$), and generates the n-variable symmetric indeterminate equation $X(x_1, \ldots, x_n)$ based on a quotient obtained by dividing the provisional constant term by the polynomial $u_{x1}(t)u_{xj}(t)$ and a remainder. Then, the key output module 47 outputs n polynomials $u_{x1}(t), \ldots, u_{xn}(t)$ as a private key, and outputs an n-variable symmetric indeterminate equation $X(x_1, \ldots, x_n)$ as a public key.

Regarding variations in which the degree of the coefficient $m_{ij}(t)$ of the plaintext polynomial is changed for each term, a part that changes the above-described embodiment is as follows. First, in the encryption, when the encryption module 5 generates the plaintext polynomial m(x, y), the input of the system parameters p, $D_m$, and $d_m$ to the polynomial generation module 6 is changed. The encryption module 5 of this variation designates p, $d_{m, Dm}$, $d_{m, Dm-1}, \ldots, d_{m, 1} d_{m, 0}$ for each degree and issues an instruction to the polynomial generation module 6. Here, $d_{m, v}$ represents the degree of the Vth-degree coefficient of m(x, y).

In decryption, when the approximate GCD, that is, $s(u_x(t), u_y(t))$ can be calculated, the decryption module 23 calculates $m(u_x(t), u_y(t))$ from $h_1(t)$ mod $s(u_x(t), u_y(t))$, and inputs $m(u_x(t), u_y(t))$ to the plaintext polynomial restoration module 27 together with the zero-point u and the system parameters d, $d_{m, Dm}, d_{m, Dm-1}, \ldots, d_{m, 1}, d_{m, 0}$. The plaintext polynomial restoration module 27 inputs the restored m(x, y) to the decryption module 23. When m(x, y) cannot be restored, the plaintext polynomial restoration module 27 inputs an error to the decryption module 23.

The description of the specific configurations of the encryption device 10, the decryption devices 20 and 20-2, and the key generation device 40 according to the present embodiment is thus completed.

Examination of Security

Hereinafter, the security of the public-key cryptography configured in the present embodiment will be considered.

Note that the key recovery attack for recovering the private key from the public key is a solution problem of an indeterminate equation without a general solution algorithm, and thus will be considered only in the context of a brute-force attack.

Coefficient Comparison Attack

The coefficient comparison attack is an attack technique in which unknown parts of a plaintext polynomial, a random polynomial, and a noise polynomial in a ciphertext are, calculated as variables, and simultaneous equations generated by coefficient comparison with an actual ciphertext are solved to derive the plaintext polynomial together with other unknown parts. In the case of this method, the known part is only the following formula (79).

$$X(x, y) = \sum_{(i,j,k) \in \Delta_X} \mu_{ijk} x^i y^j t^k \tag{79}$$

The unknown part is represented by the following formula (80).

$$m = \sum_{(i,j,k) \in \Delta_m} m_{ijk} x^i y^j t^k \tag{80}$$

$$r = \sum_{(i,j,k) \in \Delta_r} r_{ijk} x^i y^j t^k$$

$$s = \sum_{(i,j,k) \in \Delta_s} s_{ijk} x^i y^j t^k$$

$$e = \sum_{(i,j,k) \in \Delta_e} e_{ijk} x^i y^j t^k$$

When a ciphertext is created on the basis of the above-described formula (41) using these, the following formula (81) is obtained.

$$c(x, y) = \left(\sum_{(i,j,k) \in \Delta_s} s_{ijk} x^i y^j t^k\right)\left(\sum_{(i,j,k) \in \Delta_e} e_{ijk} x^i y^j t^k\right) + \tag{81}$$

$$\left(\sum_{(i,j,k) \in \Delta_r} \mu_{ijk} x^i y^j t^k\right)\left(\sum_{(i,j,k) \in \Delta_r} r_{ijk} x^i y^j t^k\right) + \sum_{(i,j,k) \in \Delta_m} m_{ijk} x^i y^j t^k$$

Coefficient comparison is performed between the actual ciphertext represented by the above-described formula (81) and the following formula (82). Here, $\mu_{ijk}$ and $c_{ijk}$ are known.

$$c(x, y) = \sum_{(i,j,k) \in \Delta_{X_r}} c_{ijk} x^i y^j t^k \tag{82}$$

Here, for the sake of simplicity, it is assumed that the public key X and a polynomial c (=se+Xr+m) on $F_p[t]$ corresponding to the public key X are given under the following conditions. An attack that analyzes only one of $c_1$ and $c_2$ in this manner is referred to as a one-sided attack. Here, for the sake of simplicity, the discussion will proceed with the following formula (83).

$$D_e = D_s = D_X = D_r = 1, D_m = 0 \tag{83}$$

$$d_X = d_m = d_s = d_r = d_e = 0$$

Then, m, r, s, and e are expressed by the following formula (84), and $s_{ijk}$, $e_{ijk}$, $r_{ijk}$, and $m_{ijk}$ are variables that take values for $F_p$. In addition, X and c are respectively multi-plied by the following formula (85), and $\tau_{ijk}$ and $c_{ijk}$ are constants having values for $F_p$.

$$s(x, y) = s_{100} x + s_{010} y + s_{000} \tag{84}$$

$$e(x, y) = e_{100} x + e_{010} y + e_{000}$$

$$r(x, y) = r_{100} x + r_{010} y + r_{000}$$

$$m(x, y) = m_{000}$$

$$X(x, y) = \tau_{100} x + \tau_{010} y + \tau_{000} \tag{85}$$

$$c(x, y) = c_{200} x^2 + c_{110} xy + c_{020} y^2 + c_{100} x + c_{010} y + c_{000}$$

Here, by comparing the terms of $x^2$, xy, $y^2$, X, y and the constant term, simultaneous equations of the following formula (86) can be derived.

$$s_{100} e_{100} + \tau_{100} r_{100} = c_{200} \tag{86}$$

$$s_{100} e_{010} + s_{010} e_{100} + \tau_{100} r_{010} + \tau_{010} r_{100} = c_{110}$$

$$s_{010} e_{010} + \tau_{010} r_{010} = c_{020}$$

$$s_{100} e_{000} + s_{000} c_{100} + \tau_{100} \tau_{000} + \tau_{000} \tau_{100} = c_{100}$$

$$s_{010} e_{000} + s_{000} e_{010} + \tau_{010} r_{000} + \tau_{000} r_{010} = c_{010}$$

$$s_{000} e_{000} + \tau_{000} r_{000} + m_{000} = c_{000}$$

This simultaneous equation is a nonlinear indeterminate equation since the variable is 10 and the equation is 6. In general, the number of variables is $\#\Delta_{Ds,\ ds} + \#\Delta_{De,\ de} + \#\Delta_{Dr,\ dr} + \#\Delta_{Dm,\ dm}$, and the number of equations is $\#\Delta_{Dx+Dr,\ dx+dr}$. When $d_x$ and $d_r$ are increased, it is not an indeterminate equation, but it becomes a solution problem of a nonlinear multivariable simultaneous equation known as NP-hard.

Linear Algebraic Attack

The linear algebraic attack is an attack method in which a nonlinear simultaneous equation is originally derived by linearizing a nonlinear portion in a coefficient comparison attack, but is changed to a linear simultaneous equation. This makes it possible to dramatically reduce the amount of attack calculation. Linearizing the nonlinear portion means setting an unknown part when the nonlinear portion (that is, a portion corresponding to a product) is regarded as a polynomial of a lump. In this method, since the term (plaintext term) in which the plaintext is embedded is nonlinear, such as s(x, y)e(x, y), this portion is collectively set as one polynomial SE(x, y), that is, the ciphertext is set as the following formula (87).

$$c(x, y) = SE(x, y) + X(x, y)r(x, y) + m(x, y) \tag{87}$$

Assuming that the unknown part is SE, r, and m, the unknown part is applied to c(x, y) by using the parameters expressed in the above-described formula (83) to obtain the following formula (88), and the known parts X and c are expressed as in the following formula (89), the following simultaneous formula (90) is derived by the same consideration as the coefficient comparison attack.

$$SE(x, y) = SE_{200}x^2 + SE_{110}xy + SE_{020}y^2 + SE_{100}x + SE_{010}y + SE_{000} \quad (88)$$

$$r(x, y) = r_{100}x + r_{010}y + r_{000}$$

$$m(x, y) = m_{000}$$

$$X(x, y) = \tau_{100}x + \tau_{010}y + \tau_{000} \quad (89)$$

$$c(x, y) = c_{200}x^2 + c_{110}xy + c_{020}y^2 + c_{100}x + c_{010}y + c_{000}$$

$$SE_{200} + \tau_{100}\tau_{100} = c_{200} \quad (90)$$

$$SE_{110} + \tau_{100}r_{010} + \tau_{010}r_{100} = c_{110}$$

$$SE_{020} + \tau_{010}r_{010} = c_{020}$$

$$SE_{100} + \tau_{100}r_{000} + \tau_{000}r_{100} = c_{100}$$

$$SE_{010} + \tau_{010}r_{000} + \tau_{000}r_{010} = c_{010}$$

$$SE_{000} + \tau_{000}r_{000} + m_{000} = c_{000}$$

This simultaneous equation is a linear indeterminate equation since the variable is 10 and the equation is 6. In general, the number of variables is $\#\Delta_{Dx+Dr, dx+dr} + \#\Delta_{Dr, dr} + \#\Delta_{Dm, dm}$, and the number of equations is $\#\Delta_{Dx+Dr, dx+dr}$. From this, there is a solution space of only $\#\Delta_{Dr, dr} + \#\Delta_{Dm, dm}$ dimensions. In fact, when an arbitrary element of $F_p$ is substituted into the variables $r_{ijk}$ and $m_{ijk}$, $SE_{ijk}$ corresponding thereto is obtained. However, the correct $SE_{ijk}$ as a decryption result is one of them, and the only way to determine this is to check that the factorization of the derived SE(x, y) results in s(x, y)e(x, y). The only known way to do this so far is to brute-force the solution space (other than by the coefficient comparison attack). Therefore, if a solution space having a sufficient size to avoid a brute-force attack is obtained, this attack can be prevented.

Brute-Force Attack

The resistance to various attacks described above is basically evaluated by a calculation amount of solving simultaneous equations, but these are reconsidered from the viewpoint of a brute-force attack. In the coefficient comparison attack, by brute-force hitting m(x, y), s(x, y) and e(x, y) can be obtained by ideal decomposition by the same means as decryption. Considering in this way, the number of round trips of m(x, y) becomes $p^{10(dm+1)}$ when $D_m=3$ (because it is the power of the number of individuals of the variable of the gauge number p of the finite field), and the calculation amount also increases exponentially. The same applies to the linear algebraic attack.

Also in the key recovery attack, it is necessary to obtain both $(u_x(t), u_y(t))$ when solving the multivariable simultaneous equations. However, this can be obtained by brute-forcing one (for example, $u_x(t)$) and solving $X(u_x(t), y)=0$ for the corresponding one ($(u_y(t)$ in this case). Taking these together, it is necessary to consider the brute-forcing of $u_x(t)$, and the number of brute-forces is $p^{d+1}$, which also increases exponentially.

From the above-described consideration, it is found that the amount of calculation increases exponentially in any existing attack, and the encryption of the present embodiment has sufficient security.

Finally, an example of a hardware configuration of the encryption device 10, the decryption devices 20 and 20-2, and the key generation device 40 according to the embodiment will be described.

Example of Hardware Configuration

Figure 11:
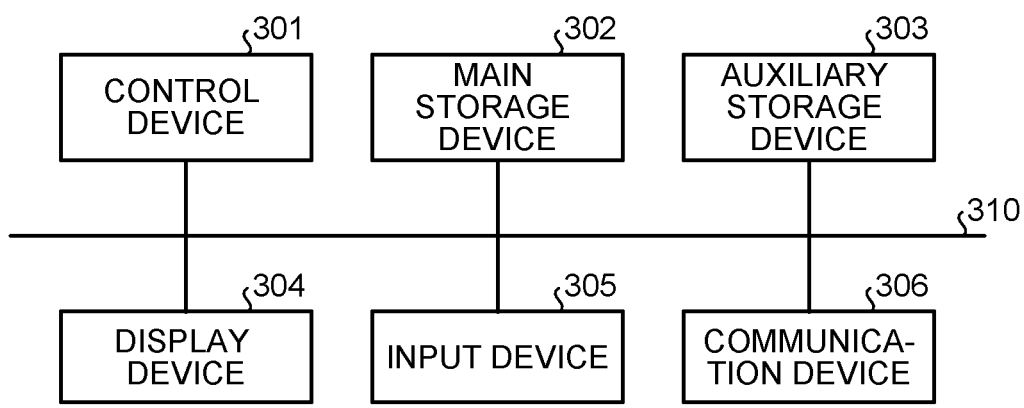
FIG. 11 is a diagram illustrating an example of a hardware configuration of an encryption device, a decryption device, and a key generation device according to an embodiment.

FIG. 11 is a diagram illustrating an example of a hardware configuration of the encryption device 10, the decryption devices 20 and 20-2, and the key generation device 40 according to the embodiment.

The encryption device 10, the decryption devices 20 and 20-2, and the key generation device 40 of the embodiment include a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected via a bus 310.

The control device 301 executes a program read from the auxiliary storage device 303 to the main storage device 302. The main storage device 302 is a memory such as a read only memory (ROM) and a random access memory (RAM). The auxiliary storage device 303 is a hard disk drive (HDD), a solid state drive (SSD), a memory card, or the like.

The display device 304 displays display information. The display device 304 is, for example, a liquid crystal display or the like. The input device 305 is an interface for operating a computer. The input device 305 is, for example, a keyboard, a mouse, or the like. When the computer is a smart device such as a smartphone and a tablet terminal, the display device 304 and the input device 305 are, for example, touch panels. The communication device 306 is an interface for communicating with other devices.

The program executed by the computer is recorded as a file in an installable format or an executable format in a computer-readable storage medium such as a CD-ROM, a memory card, a CD-R, and a digital versatile disc (DVD), and is provided as a computer program product.

In addition, the program executed by the computer may be stored on a computer connected to a network such as the Internet and provided by being downloaded via the network. In addition, the program executed by the computer may be provided via a network such as the Internet without being downloaded.

In addition, the program executed by the computer may be provided by being incorporated in a ROM or the like in advance.

The program executed by the computer has a module configuration including functional blocks that can also be realized by the program among the functional configurations (functional blocks) of the encryption device 10, the decryption devices 20 and 20-2, and the key generation device 40 of the embodiment. As actual hardware, each functional block is loaded on the main storage device 302 by the control device 301 reading and executing a program from the storage medium. That is, the functional blocks are generated on the main storage device 302.

Some or all of the functional blocks described above may not be implemented by software, but may be implemented by hardware such as an integrated circuit (IC).

In addition, in a case where each function is realized by using a plurality of processors, each processor may realize one of the functions or may realize two or more of the functions.

In addition, the operation form of the computer that implements the encryption device 10, the decryption devices 20 and 20-2, and the key generation device 40 of the embodiment may be arbitrary. For example, the encryption device 10 (decryption devices 20 and 20-2, key generation device 40) may be realized by one computer. Furthermore, for example, the encryption device 10, the decryption devices 20 and 20-2, and the key generation device 40 may be operated as a cloud system on a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An encryption device comprising:

a memory; and one or more processors coupled to the memory and configured to:

acquire a plaintext M from an application;

acquire, as a public key, an n-variable symmetric indeterminate equation $X(x_1, \ldots, x_n)$ having, as a coefficient, an element of less than or equal to a constant degree of a univariable polynomial ring $F_p[t]$ on a finite field $F_p$ and being symmetric with respect to at least two variables;

embed the plaintext M in coefficients of an n-variable plaintext polynomial $m(x_1, \ldots, x_n)$ having an element of less than or equal to a constant degree of the univariable polynomial ring $F_p[t]$ as a coefficient;

randomly generate an n-variable polynomial $r(x_1, \ldots, x_n)$ having an element of less than or equal to a constant degree of the univariable polynomial ring $F_p[t]$ as a coefficient, randomly generate an n-variable symmetric polynomial $s(x_1, \ldots, x_n)$ having an element of less than or equal to a constant degree of the univariable polynomial ring $F_p[t]$ as a coefficient and being symmetric with respect to at least two variables, and randomly generate a noise polynomial $e(x_1, \ldots, x_n)$ having an element of less than or equal to a constant degree of the univariable polynomial ring $F_p[t]$ as a coefficient;

generate a ciphertext $c(x_1, \ldots, x_n)$ by encryption processing of performing an operation including at least one of addition, subtraction, and multiplication of the n-variable polynomial $r(x_1, \ldots, x_n)$, the n-variable symmetric polynomial $s(x_1, \ldots, x_n)$, the noise polynomial $e(x_1, \ldots, x_n)$, and the n-variable symmetric indeterminate equation $X(x_1, \ldots, x_n)$ on the n-variable plaintext polynomial $m(x_1, \ldots, x_n)$; and output the ciphertext $c(x_1, \ldots, x_n)$ to the application.

2. A decryption device comprising:

a memory; and one or more processors coupled to the memory and configured to:

acquire a ciphertext $c(x_1, \ldots, x_i, \ldots x_j, \ldots, x_n)$ from an application, where $1 \leq i \leq j \leq n$;

acquire, as a private key, one or more zero-points u of an n-variable symmetric indeterminate equation $X(x_1, \ldots x_i, \ldots x_j, \ldots, x_n)$ having an element of less than or equal to a constant degree of a univariable polynomial ring $F_p[t]$ on a finite field $F_p$ as a coefficient and being symmetric with respect to at least two variables $x_i$ and $x_j$ ($1 \leq i \leq j \leq n$);

generate a univariable polynomial $h_1(t)$ by substituting the zero-point u into the ciphertext $c(x_1, \ldots, x_i, \ldots x_j, \ldots, x_n)$, and generate a univariable polynomial $h_2(t)$ by substituting the zero-point u into a ciphertext $c(x_1, \ldots, x_j, \ldots x_i, \ldots, x_n)$ obtained by inverting the variable $x_i$ and the variable $x_j$ of the ciphertext $c(x_1, \ldots, x_i, \ldots, x_j, \ldots, x_n)$;

calculate an approximate GCD (Greatest Common Divisor) of the univariable polynomial $h_k(t)$ (k=1, 2) to obtain a univariable polynomial m(u) obtained by substituting the zero-point u into an n-variable plaintext polynomial $m(x_1, \ldots, x_n)$;

obtain a plaintext polynomial $m(x_1, \ldots, x_n)$ by solving simultaneous linear equations derived from the univariable polynomial m(u) and the one or more zero-points u;

decrypt a plaintext M from coefficients of the plaintext polynomial $m(x_1, \ldots, x_n)$; and output the plaintext M to the application.

3. An encryption method implemented by a computer functioning as an encryption device, the method comprising:

acquiring, by the encryption device, a plaintext M from an application;

acquiring, by the encryption device, as a public key, an n-variable symmetric indeterminate equation $X(x_1, \ldots, x_n)$ having, as a coefficient, an element of less than or equal to a constant degree of a univariable polynomial ring $F_p[t]$ on a finite field $F_p$ and being symmetric with respect to at least two variables;

embedding, by the encryption device, h plaintext M in coefficients of an n-variable plaintext polynomial $m(x_1, \ldots, x_n)$ having an element of less than or equal to a constant degree of the univariable polynomial ring $F_p[t]$ as a coefficient;

by the encryption device, randomly generating an n-variable polynomial $r(x_1, \ldots x_n)$ having an element of less than or equal to a constant degree of the univariable polynomial ring $F_p[t]$ as a coefficient, randomly generating an n-variable symmetric polynomial $s(x_1, \ldots, x_n)$ having an element of less than or equal to a constant degree of the univariable polynomial ring $F_p[t]$ as a coefficient and being symmetric with respect to at least two variables, and randomly generating a noise polynomial $e(x_1, \ldots, x_n)$ having an element of less than or equal to a constant degree of the univariable polynomial ring $F_p[t]$ as a coefficient;

generating, by the encryption device, a ciphertext $c(x_1, \ldots, x_n)$ by encryption processing of performing an operation including at least one of addition, subtraction, and multiplication of the n-variable polynomial $r(x_1, \ldots, x_n)$, the n-variable symmetric polynomial $s(x_1, \ldots, x_n)$, the noise polynomial $e(x_1, \ldots, x_n)$, and the n-variable symmetric indeterminate equation $X(x_1, \ldots, x_n)$ on the n-variable plaintext polynomial $m(x_1, \ldots, x_n)$; and outputting the ciphertext $c(x_1, \ldots, x_n)$ to the application.

4. A decryption method implemented by a computer functioning as a decryption device, the method comprising:

acquiring, by the decryption device, a ciphertext $c(x_1, \ldots x_i, \ldots x_j, \ldots, x_n)$ from an application, where $1 \leq i \leq j \leq n$;

acquiring, by the decryption device, as a private key, one or more zero-points u of an n-variable symmetric indeterminate equation $X(x_1, \ldots x_i, \ldots x_j, \ldots, x_n)$ having an element of less than or equal to a constant degree of a univariable polynomial ring $F_p[t]$ on a finite field $F_p$ as a coefficient and being symmetric with respect to at least two variables $x_i$ and $x_j$ ($1 \leq i \leq j \geq n$);

by the decryption device, generating a univariable polynomial $h_1(t)$ by substituting the zero-point u into the ciphertext $c(x_1, \ldots, x_i, \ldots, x_j, \ldots, x_n)$, and generating a univariable polynomial $h_2(t)$ by substituting the zero-point u into a ciphertext $c(x_1, \ldots, x_j, \ldots x_i, \ldots, x_n)$ obtained by inverting the variable $x_i$ and the variable $x_j$ of the ciphertext $c(x_1, \ldots, x_i, \ldots, x_j, \ldots, x_n)$;

calculating, by the decryption device, an approximate GCD (Greatest Common Divisor) of the univariable polynomial $h_k(t)$ (k=1, 2) to obtain a univariable polynomial m(u) obtained by substituting the zero-point u into an n-variable plaintext polynomial $m(x_1, \ldots, x_n)$;

obtaining, by the decryption device, a plaintext polynomial $m(x_1, \ldots, x_n)$ by solving simultaneous linear equations derived from the univariable polynomial m(u) and the one or more zero-points u;

decrypting, by the decryption device, a plaintext M from coefficients of the plaintext polynomial $m(x_1, \ldots, x_n)$; and outputting the plaintext M to the application.

5. A computer program product for encryption comprising a non-transitory computer-readable medium including instructions stored thereon, the instructions causing a computer to execute:

acquiring a plaintext M from an application;

acquiring, as a public key, an n-variable symmetric indeterminate equation $X(x_1, \ldots, x_n)$ having, as a coefficient, an element of less than or equal to a constant degree of a univariable polynomial ring $F_p[t]$ on a finite field $F_p$ and being symmetric with respect to at least two variables;

embedding the plaintext M in coefficients of an n-variable plaintext polynomial $m(x_1, \ldots, x_n)$ having an element of less than or equal to a constant degree of the univariable polynomial ring $F_p[t]$ as a coefficient;

randomly generating an n-variable polynomial $r(x_1, \ldots, x_n)$ having an element of less than or equal to a constant degree of the univariable polynomial ring $F_p[t]$ as a coefficient, randomly generating an n-variable symmetric polynomial $s(x_1, \ldots, x_n)$ having an element of less than or equal to a constant degree of the univariable polynomial ring $F_p[t]$ as a coefficient and being symmetric with respect to at least two variables, and randomly generating a noise polynomial $e(x_1, \ldots, x_n)$ having an element of less than or equal to a constant degree of the univariable polynomial ring $F_p[t]$ as a coefficient;

generating a ciphertext $c(x_1, \ldots, x_n)$ by encryption processing of performing an operation including at least one of addition, subtraction, and multiplication of the n-variable polynomial $r(x_1, \ldots, x_n)$, the n-variable symmetric polynomial $s(x_1, \ldots, x_n)$, the noise polynomial $e(x_1, \ldots, x_n)$, and the n-variable symmetric indeterminate equation $X(x_1, \ldots, x_n)$ on the n-variable plaintext polynomial $m(x_1, \ldots, x_n)$; and outputting the ciphertext $c(x_1, \ldots, x_n)$ to the application.

6. A computer program product for decryption comprising a non-transitory computer-readable medium including instructions stored thereon, the instructions causing a computer to execute:

acquiring a ciphertext $c(x_1, \ldots x_i, \ldots x_j, \ldots, x_n)$ from an application, where $1 \leq i \leq j \leq n$;

acquiring, as a private key, one or more zero-points u of an n-variable symmetric indeterminate equation $X(x_1, \ldots x_i, \ldots x_j, \ldots, x_n)$ having an element of less than or equal to a constant degree of a univariable polynomial ring $F_p[t]$ on a finite field $F_p$ as a coefficient and being symmetric with respect to at least two variables $x_i$ and $x_j$ ($1 \leq i \leq j \leq n$);

generating a univariable polynomial $h_1(t)$ by substituting the zero-point u into the ciphertext $c(x_1, \ldots, x_i, \ldots, x_j, \ldots, x_n)$, and generating a univariable polynomial $h_2(t)$ by substituting the zero-point u into a ciphertext $c(x_1, \ldots x_j, \ldots x_i, \ldots, x_n)$ obtained by inverting the variable $x_i$ and the variable $x_j$ of the ciphertext $c(x_1, \ldots, x_i, \ldots x_j, \ldots, x_n)$;

calculating an approximate GCD (Greatest Common Divisor) of the univariable polynomial $h_k(t)$ (k=1, 2) to obtain a univariable polynomial m(u) obtained by substituting the zero-point u into an n-variable plaintext polynomial $m(x_1, \ldots, x_n)$;

obtaining a plaintext polynomial $m(x_1, \ldots, x_n)$ by solving simultaneous linear equations derived from the univariable polynomial m(u) and the one or more zero-points u;

decrypting a plaintext M from coefficients of the plaintext polynomial $m(x_1, \ldots, x_n)$; and outputting the plaintext M to the application.

* * * * *